(12) United States Patent
Ledzius et al.

(10) Patent No.: US 10,503,855 B2
(45) Date of Patent: Dec. 10, 2019

(54) METHODS AND SYSTEMS FOR SYSTEM DESIGN AUTOMATION (SDA) OF MIXED SIGNAL ELECTRONIC CIRCUITRY INCLUDING EMBEDDED SOFTWARE DESIGNS

(71) Applicant: CONCERTAL SYSTEMS, INC., Parker, TX (US)

(72) Inventors: Robert Charles Ledzius, Parker, TX (US); Robert James Stoddard, Kalispell, MT (US); Greg Allen Hupp, Allen, TX (US); Shalini Batra Sahni, Bengaluru (IN)

(*) Notice: Subject to any disclaimer, the term of this patent is extended or adjusted under 35 U.S.C. 154(b) by 137 days.

(21) Appl. No.: 15/878,342

(22) Filed: Jan. 23, 2018

(65) Prior Publication Data

US 2018/0218102 A1 Aug. 2, 2018

Related U.S. Application Data

(60) Provisional application No. 62/449,433, filed on Jan. 23, 2017.

(51) Int. Cl.
| | |
|---|---|
| G06F 17/50 | (2006.01) |
| G06F 16/21 | (2019.01) |
| G06F 16/28 | (2019.01) |

(52) U.S. Cl.
CPC ........ *G06F 17/5045* (2013.01); *G06F 16/212* (2019.01); *G06F 16/284* (2019.01); *G06F 17/504* (2013.01); *G06F 17/505* (2013.01); *G06F 17/5022* (2013.01); *G06F 17/5036* (2013.01); *G06F 17/5054* (2013.01); *G06F 17/5063* (2013.01); *G06F 2217/04* (2013.01); *G06F 2217/66* (2013.01)

(58) Field of Classification Search
USPC .................................. 716/102, 104, 106, 108
See application file for complete search history.

(56) References Cited

U.S. PATENT DOCUMENTS

| | | | |
|---|---|---|---|
| 7,240,303 B1 * | 7/2007 | Schubert .......... | G01R 31/31705 703/13 |
| 7,827,510 B1 * | 11/2010 | Schubert ............. | G06F 17/5027 716/111 |

(Continued)

*Primary Examiner* — Brian Ngo
(74) *Attorney, Agent, or Firm* — Hulsey PC

(57) ABSTRACT

Methods and systems for SDA of mixed signal electronic circuitry including embedded software designs for creating ASICs, sub-systems, and SoCs. The SDA system described extends IP reuse beyond the circuit and stand-alone verification capabilities that are common practice today which limit the benefits of reuse. By solving the integration problem first in a loosely coupled manner, complex mixed signal SoC devices may achieve higher levels of IP reuse with push button ease through the cloud, significantly improving time to market, design resource limitations, risks for first time silicon success, and the tasks of managing business multiple relationships of IP providers. SDA generated designs use a multi-agent method of operation, creating powerful and flexible designs that provide both NOC (Network on a Chip) and NBC (Network Beyond the Chip) for distributed system operation, and enhanced non-intrusive in-system monitoring for mission critical and safety related applications.

20 Claims, 18 Drawing Sheets

(56) References Cited

U.S. PATENT DOCUMENTS

| | | | | |
|---|---|---|---|---|
| 7,970,596 B2 * | 6/2011 | Bade | ................... | G06F 17/5022 |
| | | | | 703/13 |
| 2009/0150839 A1 * | 6/2009 | Huang | ................ | G06F 17/5027 |
| | | | | 716/106 |
| 2010/0180240 A1 * | 7/2010 | Davis | ................. | G06F 17/5031 |
| | | | | 716/113 |
| 2011/0307233 A1 * | 12/2011 | Tseng | ................. | G06F 17/5022 |
| | | | | 703/14 |

* cited by examiner

Concertal Systems Design Portal ⓘ > ✉(12) > 👤(6) > ⇦ Logout

Dashboard

IP Library >
IP Modules >
Designs >

Recent IPs

- GPIO4 General Purpose I/Os (4)
- DSP Filters
- I2C Master Interface

Recent Designs

- SPI DAC
- My ExampleDesign
- Digital Mic I/F 4x (Los Angeles)

Announcement - Concertal's SDA (System Design Automation) capabilities are currently under evaluation by two companies....

Post - Concertal SDA provides an architecture well suited for integration of AI and ML into systems as an 'add-on' feature...

Announcement - Concertal provides features able to ensure robust solutions for aiding in ISO26262 compliance. The in-...

News - ConcertalSystems, Inc. Allen, Texas, announced initial release of its new System Design Automation (SDA) Techno...

Announcement - Concertal is pleased to announce its upcoming participation at the DAC (Design Automation Conf......

Event - At the 2017 CEO Outlook event organized by the Electronic System Design Alliance (ESD Alliance), industry...

News - ConcertalSystems is pleased to announce the filing of a provisional patent for their SDA (System Design...

News - Advisory Council announces that it has a successful first meeting of its early stage Advisory Council to explore the...

| 5 New Messages! |
| View Details > |

| 11 New Requests/Tasks! |
| View Details > |

| 33 New Order Requests! |
| View Details > |

| 13 New Deficiency Tickets! |
| View Details > |

About
Concertal Systems, Inc. provides the semiconductor industry's first practical System Design Automation (SDA) solution capable of generating and verifying highly complex SoC designs from reusable IP in minutes, rather than months. Building and simulating new highly flexible designs with Concertal's web-based SDA technology requires little or no specialized IC design knowledge to get started, opening high level SoC design to a completely new audience and market customers to define and drive the innovative differentiating new products they need to succeed.

*FIG. 13*

| Players IP Library | Available IP | | | | |
|---|---|---|---|---|---|
| Processors (8) | | | | | |
| Analog Interfaces (3) | Name | Rating | Status | Gate Estimate | |
| Digital Interfaces (14) | Serial Peripheral Interface with Event Protocol | ★★★★★ | Specification | 4329 | |
| GPIO (3) | I2C Slave Interface | ★★★★★ | Alpha Release | 1460 | |
| Serial Communication (7) | I2C Master Interface | ★★★★★ | Specification | - | |
| Parallel Communication (1) | In-System Monitor | ★★★★★ | Alpha Release | - | |
| Miscellaneous (2) | Demo_SPIe | ★★★★★ | Specification | 4329 | |
| Security and Cryptography (2) | NOTE: Select an item in the table to see the detail | | | | |
| Memory Controllers (0) | | | | | |
| Internet and Networks (0) | | | | | |
| Other (14) | | | | | |
| Sandbox (6) | | | | | |

IP Details/Summary
Name: Serial Peripheral Interface with Event Protocol
Status: Specification
Description:
Standard SPI Interface with event driven protocol.

Transfer up to 16channels of identifiable data for each direction (SDI and SDO pins). The SPI protocol contains indexing and opcodes to also allow command and control, synchronous or asynchronous, real tim or burst, or other types of event data occurring with any IP within the subsystem. This IP wrapper includes an optional input/output FIFO to ensure no data is lost.

May operate in either a master or slave mode.

Design Elements    DCB  DVR  DIO  ACB  ASC  AIO  SWC
Test Bench Elements    DCB  DVR  DIO  ACB  ASC  AIO  SWC
Verification & Validation Elements    COM  TCLT  TCLS

FIG. 14

| Orchestrate | MyExampleDesign |
|---|---|
| ◈ Design Summary | Summary |
| ✧ Add IP to Design | Statistics |
| ✲ Sinks | Design Status     Estimated Gate count: 14254 |
| ✲ Sources | [Specification ▽]    Number of subsystems: 1 |
| ▦ Documentation | Verification Status    Number of IP sockets: 4 |
| ⬠ Permission | [Development - Scripts ▽]    Number of IP Types: 4 |
| △ Simulate Design | Description [Edit] |
| | Design Description |
| | [Update] |

| Bus 1 ▽ | | | | | | Collapse All |
|---|---|---|---|---|---|---|
| ⓪ Handler | | | | | | ⊘✖ |
| ① SIGGEN1 | | [UFU] [CFU] [UUL] [PUL] [SS] | | | | ⇅ ⌀ ✖ |
| ② GPIO4 | [Prototype] | [UFU] [CFU] [UUL] [PUL] [SS] | | | | ⇅ ⌀ ✖ |
| ③ SPI1 | [Beta Release] | [UFU] [CFU] [UUL] [PUL] [SS] | | | | ⇅ ⌀ ✖ |
| | [Specification] | | | | | |

IP Module Name: Serial Peripheral Interface with Event Protocol
Description:
Standard SPI Interface with event driven protocol.

Transfer up to 16channels of identifiable data for each direction (SDI and SDO pins). The SPI protocol contains indexing and opcodes to also allow command and control, synchronous or asynchronous, real tim or burst, or other types of event data occurring with any IP within the subsystem. This IP wrapper includes an optional input/output FIFO to ensure no data is lost.
May operate in either a master or slave mode.

| ④ PDM2 ▽ | [Alpha Release] | [UFU] [CFU] [UUL] [PUL] [SS] | ⇅ ⌀ ✖ |
|---|---|---|---|

Note: Click on the heading to show more options

*FIG. 15*

| Audition | IP Module ▽ | Serial Peripheral Interface with Event Protocol |

◎ General

✳ IO Pins
✳ Mode Control
✳ Signal Source
✳ Signal Sink
✳ Wire Event
🔒 Permissions Download/Upload the design file here: https://git.concertal.com/gits/spie.git/

Note: Push your changes to this git prior to making changes on this page, and pull after every change to this page. All mode control, sink, source, wire event, and IO pin names should contain only alphanumeric characters (A-z, a-z, 0-9), and the first character cannot be a digit.

☑ IP can do directed read and write
☑ IP uses a raw FIFO

Description

Standard SPI interface with event driven protocol.
Transfers up to 16 channels of identifiable data for each direction (SDI and SDO pins). The SPI protocol contains indexing and opcodes to also allow command and control, synchronous or asynchronous, real time or burst, or other types of event data occurring with any IP within the subsystem. This IP wrapper includes an optional input/output FIFO to ensure no data is lost. May operate in either a master or slave mode.

[⚙ Update]

IP Details

IP Status
[Specification ▽]

Gate Estimate
[4329]

[💾 Save IP Details]

IP Use Rights/License

| License Type | Access |
|---|---|
| Unconditional Free Use (UFU) | [Deny] |
| Conditional Free Use (CFU) | [Deny] |
| Unlimited Use (UUL) | [Allow] |
| Per Use (PUL) | [Allow] |
| Support Subscription (SS) | [Allow] |

IP Element Availability

| Model Type | Design | Test Bench |
|---|---|---|
| Digital C Behavior | [Not Included] | [Not Included] |
| Digital Verilog RTL | [Included] | [Included] |
| Digital IO | ○ | ○ |

*FIG. 17*

METHODS AND SYSTEMS FOR SYSTEM DESIGN AUTOMATION (SDA) OF MIXED SIGNAL ELECTRONIC CIRCUITRY INCLUDING EMBEDDED SOFTWARE DESIGNS

CROSS REFERENCE TO RELATED APPLICATIONS

This application further claims the benefit of the following provisional application which is here expressly incorporated by reference:

62/449,433 entitled "CLOUD BASED SERVICE FOR PERFORMING SYSTEM DESIGN AUTOMATION (SDA) OF MIXED SIGNAL WITH SOFTWARE DESIGNS," filed on Jan. 23, 2017.

FIELD OF THE DISCLOSURE

The present disclosure generally relates to methods and systems for the rapid development of ASIC, SoC, and sub-system designs for FPGA or mixed signal silicon devices, including new devices incorporating embedded software functionality. More particularly, the present disclosure provides methods and systems for system design automation (SDA) of mixed signal electronic circuitry including embedded software designs addressing needs for increased collaboration to deal with increased complexities, including, but not limited to, cloud-based implementations.

BACKGROUND

The $400B semiconductor industry is dealing with unprecedented difficulties relating to the continued increased complexities of today's new silicon. With devices including over 50M logic gates being common, and over 10% containing about 1 B transistors, the human engineer's ability to understand all aspects of the SoC (System on Chip) being designed are greatly diminished, if not over. System complexities are creating an environment of unreasonable development schedules, costs, and risks. For example, a typical 20 nm new product may take years to bring to market, cost over $150M to develop, and be outdated before reaching the required sale of over 10M units at $20 each to break even. Forecasts expect that by 2020, some parts will become 10 times more complex when reaching the 5 nm process node, with development costs exceeding $1 B. As the limits of Moore's Law are reached, the problems associated with realizing increased system complexities continue to grow as functionality extends beyond the boundaries of a monolithic devices with collaborative distributed system ecosystems.

These problems are creating difficulties in developing the new innovative products required by OEM system developers, who instead are having to settle for older existing catalog parts. System designers may no longer rely on silicon providers alone to address their SoC design needs, and require new capabilities and tools to drive the successful development of complex future ICs. The Electronic Design Automation (EDA) industry has delivered tremendous capabilities that have proven critical in bringing the semiconductor market to where it is today. Although EDA advancements have embraced and met the challenge to improve design productivity so that today's advanced processes may be utilized, together these advancements have now created a further need for SDA capabilities.

Considering the present developments and growth in the SDA industry a number of pressing needs have emerged. There are community needs by which SDA tools may provide essential interfaces to manage the integration of all IC development flow tasks. These interfaces would allow full leveraging of SDA capabilities by flow development methods, as well as the added benefit of ensuring all stakeholders of an IC development flow may work together compatibly and more effectively.

Simplicity needs exist. System designers should be free from IC hardware and/or software design burdens, as they seek to define and automate complex new SoC devices. Unlike EDA tools developed and used by IC design engineers, SDA tools need to focus primarily, but not exclusively, on system developer needs.

SDA tools also have reuse needs, including the efficient and effective reuse of functional IP. IP reuse typically fails to solve the problem of IP integration and verification. SDA tools need to provide for extending IP reuse to the way that IP is used through all IC design flow aspects. In addition, for easy reuse, cleanly partitioned IP functions should define all required functionality though automation.

Architecture needs also exist. System automation requires standardizing the way IP integrates together in a flexible and configurable manner. Architecture not only involves the circuitry required to physically connect IP functions together, but also methods for defining, managing, and optimizing the required configurability of an inherently flexible system.

Because SoCs may be very large and complex, needs exist for functional methods of bringing together communities of engineers and developers. Further, today's SDA engineering and design community seeks to deliver complete functional SoC designs including both digital and analog hardware, as well as embedded and driver software. In so doing, they concentrate on solving all aspects of the way that various functions are integrated, verified, and validated in a collaborative practical functional SDA solution. Through these efforts, the resulting SDA systems also provide a platform that manages various business aspects of building systems. These building systems include managing IP licensing from multiple vendors, including managing aspects of data, files, use support, bugs, licensing agreements, and auditing. These tasks frequently discourage the adoption of IP from outside sources.

Now, more than at any previous time, the need exists for increased collaboration to deal with increased complexities. Collaboration provides the only ways that customers, definers, decision makers, designers, manufacturers, and suppliers may work closer to ensure project success. Installing new software tools may require laborious evaluation and approvals, making it difficult to adopt new disruptive capabilities. Acceleration capabilities may create unreasonable demand spikes on available infrastructure. Yet, security risks for increased collaboration necessitate a safe neutral ecosystem that remains accessible to all stakeholders. Properly addressing these growing concerns becomes ever more necessary.

The IP market has been demonstrating 15-22% growth, with a forecast for continuing growth of about 18% over the next several years. But this is without the use of SDA capabilities. SDA further addresses, and even removes, some of the known barriers to IP reuse, further extending the benefit of IP reuse to all aspects of the IC design flow. As such, SDA may significantly increase the IP market Compound Annual Growth Rate (CAGR) to create and meet a significant untapped identified and growing market need.

Further, the pervasive use of Artificial Intelligence (AI) hardware and software launches mankind into the dawn of a new era. System developers at the forefront of AI advancements are developing and deploying new capabilities for interacting with an ever-evolving and random world. System design needs for automating autonomous tasks in collaboratively working with distributed systems emerge from future growing engineering and design complexities. Many needs exist for SDA-based designs that provide a powerful and simple path to either interface or integrate Machine Learning (ML) and AI capabilities into scalable and flexible designs.

There are needs for SDA designs to offer developers maximum operational flexibility. Mixed signal hardware and software IP must operate together as a multi-agent system, requiring no master controller to collaborate. Further, SDA-based designs must route data as necessary through the entire system, while providing all the 'hooks' necessary to provide system observability, and adaptability. There are needs for SDA system features that make designs 'AI-friendly,' so that integration of ML and AI IP may be simply plugged into the system. Existing working system operation need to be monitored for ML, and behavior adapted, during operation using AI mixed signal IP tools. Additionally, input data from other outside sources may also be observed for improved intelligent operation. Today, no known standard system or approach satisfies these increasingly acute needs.

The time of intelligent adaptable distributed system operation is upon us. Old methods of operation and interoperability fall short. Today, the industry demands a simple and efficient approach to automate system design for the future.

BRIEF SUMMARY

The disclosed subject matter provides methods and systems for SDA of mixed signal electronic circuitry including embedded software designs.

The present disclosed subject matter generally relates to SDA capabilities or services for the rapid development of ASIC, SoC, and sub-system designs for FPGA or mixed signal silicon devices, including new devices incorporating embedded software functionality. In one embodiment, the SDA flow is cloud-based and implemented in three phases which require no special software or tools installed at the user or client side:

Phase 1: Functional hardware or software module selection and tool selection and design with test bench automated build and verification Phase 2: System Design User (SDU) use case definition and regression simulations Phase 3: Final design optimization.

Using the SDA methods and systems here described, the SDU requires no expert IC design knowledge to define, build, and simulate the desired product from reused IP. The SDU may search, browse, and select desired IP functionality much like any other common online shopping experience. A tabulating system indicates final design estimates as selections are made for die size, pin count, IP license fees, total part cost, and other useful information. Once the functional selection process is completed, the SDU may automatically integrate and assemble the new design and corresponding simulation test bench at the push of a single button. Within short order, automatic cloud-side mixed signal simulation for integrated IP tool verification begins verifying the resulting design is properly operating, and indicates where possible problems might exist. The resulting design is highly flexible and configurable through defined parameters that define the manner IP is to work together, all controllable through a test bench debug port in simulation and/or other interfaces. Configuration of parameters for each IP control data input source routing among the chip fabric, as well as mixed signal mode controls, and are all part of the cloud design database that relationally represents the specified design. Server-side simulation ensures valuable IP implementation details may remain private, allowing an SDU to try before committing to license or buy mixed signal IP from $3^{rd}$ party developers.

Once the design and test bench are auto-built and auto-verified to be operational, the SDU is ready to use the high-level verification test case definer to specify how IP should be configured to work together to perform application specific targeted operational use cases. Since all aspects of the design are accessible through a database, test cases may be defined through an intuitive easy to use web application where the SDU specifies test bench signal source conditions, data and signal event routing between IP tools, and IP mode control settings within the design.

SDUs are also able to define and manipulate test bench signal monitors to set automatic pass/fail checks for the use case simulation. The verification test case definer web application may use a variety of methods and views to aid SDUs in working with their custom design. Such methods and related tools may define operational requirement use cases that become part of an overall regression for verification family of test cases. These might include table manipulations, GUI drop box selections, and/or schematic like graphic data flow representations, all working through the database parameter definitions to manipulate the collaborative nature of the system. Simulation efficient models are used to validate the interoperable aspects of the final design, all while collecting operational metrics that may be used to further optimize and adjust the design if needed.

The last phase of SDA allows for the design to be optimized for the defined use cases. Implemented assertion checks within the IP sockets, integration backbone, and test bench ensures problem areas are identified and may be addressed. One example would include the monitoring and reporting of internal integration bus bandwidth use, allowing IP tools to be automatically partitioned into subsystems to address bandwidth issues.

A second example is identifying any possible missed data transfers and the automatic adjustment of IP I/O FIFO depths to ensure data is not lost when the bus might remain busy for long periods of time. A third example includes the automated analysis of verification test cases for the utilized configuration states and optimizing the auto-built integration circuitry to include only the flexibility required by the functionally verified design.

Typically, multi-agent system operation has referred to software system solutions, and the presently disclosed SDA multi-agent architecture applies to both HW and SW functional integration, even beyond physical semiconductor package boundaries. This makes the presently disclosed SDA-based designs useful for addressing the difficult aspects of building robust distributed systems. For example, a vehicle's AI ABS subsystem might benefit from other vehicle AI galaxy sensor data, further interacting with an adaptive AI traffic control cluster, that eventually works together within a city corridor's super galaxy. In such an example, it's clear that each level of AI must be able to work autonomously, yet collaboratively with its surrounding. Further, it must be able to be incrementally deployed and interact with all kinds of random events.

A technical aspect of the present disclosure includes providing methods and systems for SDA of mixed signal electronic circuitry including embedded software designs for creating Application Specific Integrated Circuits (ASICs), sub-systems, and SoCs. The SDA system described extends IP reuse beyond the circuit and standalone verification capabilities that are common practice today which limit the benefits of reuse. By solving the integration problem first in a loosely coupled manner, complex mixed signal SoC devices may achieve higher levels of IP reuse with push button ease through the cloud, significantly improving time to market, design resource limitations, risks for first time silicon success, and the tasks of managing business multiple relationships of IP providers. SDA generated designs use a multi-agent method of operation, creating powerful and flexible designs that provide both Network on a Chip (NOC) and Network Beyond the Chip (NBC) for distributed system operation, and enhanced non-intrusive in-system monitoring for mission critical and safety related applications. The method of operation also eases integration of AI and ML functionality.

Another technical aspect of the present disclosure includes methods and systems for SDA of mixed signal electronic circuitry including embedded software designs that enable the system developer to build and simulate new designs in minutes using SDA. The disclosed subject matter provides programs and/or scripts that automate the generation wrappers from system integration database entries for mixed signal circuitry and software IP tools. The presently disclosed methods and systems provide methods of operation able to present outputs in an identifiable manner and implement configurable or fixed input select control circuitry or software for tool inputs. From this derives assembling the tools as a system through a NoC and software operating system (OS) implementation. The present disclosure, thus, provides programs and/or scripts that compile the generated design and test bench, and execute inherited simulation stimulus and self-checks from the IP tool containers. Note, however, that the presently disclosed IP modules do not necessarily need to be designed in a multi-agent loosely coupled operational manner, as the wrapper takes care of this need for the IP function.

The disclosed configuration architecture allows this to be either inherited IP script or database driven. Here it is convenient to systematically collect and store wrapper simulation data so that it may be analyzed and drive database entry optimizations for a design based on the way it's used in verification.

The disclosed subject matter also provides relational database functionality. Here, mixed signal circuitry and/or software tool design files are organized, stored, as IP containers and accessed using a version control system such as Git (/git/) in a usable form for accomplishing SDA. This SDA system provides a common integration and method of use allowing systematic implementation for all aspects of IP reuse that may be represented in database form from the container, and working with the relational database and code generators.

Yet a further technical aspect of the present disclosure includes a system architecture whereby data and signals may flow between mixed signal hardware or circuitry and/or software tools, which may be implemented with IP source identifiers (source-based addresses, indexes). In this way, tool inputs may be obtained through configuration selects implemented in HW IP or SW IP wrappers, and further so that configuration information may be represented in a relational database form. Configuration selects are implemented as system user configurable or fixed configuration settings from the database. Source identifiers may be kept as absolute (unchanged) or relative (modified as it flows through connected subsystems). Integrated operation is accomplished as a "configure input selects and let it work" manner. In other words, Functional IP may operate together in an integrated form without the need of a typical central controller to control dataflow for the system, greatly simplifying the functional integration and automation build problem.

A yet further technical advantage of the presently disclosed subject matter includes the ability to support a cloud-based collaborative environment. The subject matter here disclosed may be accomplish with either a software installation, or via a cloud-based implementation without a software installation. Using a cloud-based shared environment for all stakeholders of a new design effort, the present SDA system provides a cloud-based IP tool for representing IP in a database form that facilitates automation. The cloud-based IP tool here disclosed manages all IPs owned/controlled by a user/group for design, support, and/or business management. The presently disclosed cloud based design tool enables defining a design and an associated test bench, including the IP that the design uses and the configuration of each of the employed IP tools. Still further, the cloud-based environment here provided enables a cloud-based simulation tool for verifying circuitry and software mixed signal designs.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGS. and examples are not meant to limit the scope of the present subject matter to a single embodiment, but other embodiments are possible by way of interchange of some or all of the described or illustrated elements, that is, FIGUREs may be somewhat simplified from showing all features that may be included in order to present the subject matter in a clearer manner, and, further, wherein:

FIGS. 13 throught 17 show web browser views of SDA access and use for use with an exemplary embodiment of the present subject matter.

DETAILED DESCRIPTION OF ILLUSTRATIVE EMBODIMENTS

Figure 1:
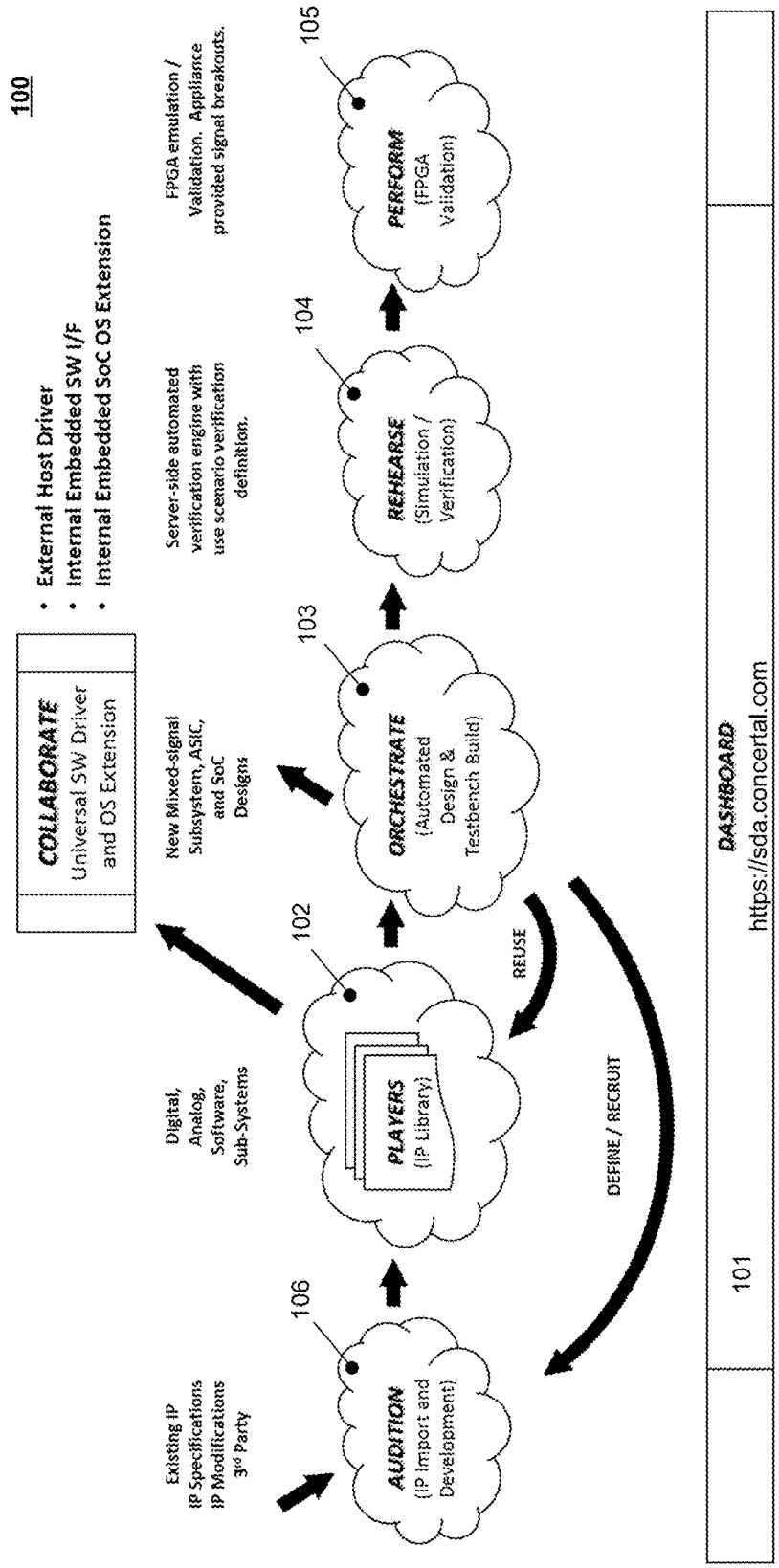
FIG. 1 shows SDA cloud application partitioning according to the teachings of the present disclosure.

The detailed description set forth below in connection with the appended drawings is intended as a description of exemplary embodiments in which the presently disclosed process may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration.

Provided are novel methods and systems for SDA of mixed signal electronic circuitry including embedded software designs for creating ASICs, SoCs, FPGA based designs, and subsystems. Reference will now be made in detail to the example embodiment illustrated in the accompanying drawings. While the disclosed subject matter will be described in conjunction with the embodiment below, it will be understood that it is not intended to limit the disclosed subject matter to this embodiment and examples.

On the contrary, the disclosed subject matter is intended to cover alternatives, modifications and equivalents, which may be included within the spirit and scope of the disclosed subject matter as defined by the appended claims. Furthermore, in the following detailed description of the present disclosed subject matter, numerous specific details are set forth in order to more fully illustrate the present disclosed subject matter. However, it will be apparent to one of ordinary skill in the prior art that the present disclosed subject matter may be practiced without these specific details. In other instances, well-known methods and procedures, components and processes have not been described in detail so as not to unnecessarily obscure aspects of the present disclosed subject matter.

It will, of course, be appreciated that in the development of any such actual implementation, numerous implementation-specific decisions must be made to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The method and system of the present disclosure enable the ability to build and simulate new mixed signal circuit and software designs in minutes. SDA simplifies and accelerates front-end chip development, expanding user base beyond expert designers so they may simply select desired IP functionality and begin system simulations with little effort. The presently disclosed methods and architecture for automating the earliest tasks provides practical and tangible benefits to all stakeholders through the entire development and product life cycle.

The SDA functions automate design and test bench builds, provide for IP reuse verification, and even integration optimization based on system use cases. The system of the present disclosure provides build designs and test benches that auto generate highly flexible and configurable designs. This includes IP wrappers, interconnect and buss fabric, documentation, test benches, and debug capability, all at the push of a button.

The method and system of the present disclosure enable verifying integrated IP functions. By permitting auto verification of IP in an integrated system form, and building a complete task-based mixed signal environment for the new system, users may begin building system-level targeted functional test-cases. The disclosed method and system also provide a framework able to support flow for verification-driven design that auto optimizes the integration of the design for the manner that IP is actually used together in a system, while including only the flexibility required or desired.

The presently disclosed method and system employs relational database functionality and collaborative operational attributes that are managed through the relational database. In this construction, SDA efforts are driven from the database. For instance, the present method and system provide inheritance functions where with a selected IP specification, configuration, and use requirements. Such inheritable functions from the PLAYERs IP library can be automatically used through the system verification flow.

Here, system requirements may be managed through a scoreboard. These system requirements are captured so they may be bound to verification test cases. Specifications not critical to the design need may be marked as non-critical, driving further IP optimization decisions. Moreover, mixed signal test cases may be applied. Thus, mixed signal system test cases are built through database parameter control and auto generated when simulated.

The method and system of the present disclosure includes unique system architecture attributes. With the presently disclosed subject matter, system architecture provides object oriented-like IP integration, and has been developed to facilitate automation. Here, integration overhead may be managed and optimized through use of the relational database.

With the operational methods of the present disclosure, the task of automating the system IP components begins with a solution for solving the integration problem. Connectivity and configurable collaborative interoperability of IP needs are addressed, with them all parameterized for control through the database. In this context, SDA becomes flexible and scalable. Here, SDA designs are built with clean IP partitioning, and are inherently flexible, scalable, and highly configurable. Here, too, SDA integration wrapper functionality may be easily optimized. A collective design may be rapidly optimized through database attributes, or in system program configurations where required.

One aspect of the present disclosure includes a cloud-based collaborative environment, which establishes easy access to a presently disclosed shared SDA eco-system of the present disclosure. The shared SDA eco-system helps to ensure that any stakeholder in a new design has the ability to quickly initiate and collaborate on new product development opportunities, in a highly functional and effective way.

With the presently disclosed method and system, there are no required software installs. Preferably with a cloud-based platform, there is easy access to the present shared SDA eco-system. This access ensures that any stakeholder in a new design has the ability to quickly initiate and collaborate on new product development opportunities, in a highly functional and effective way. At the same time, if a software installation is desired, such an installation may be effected to provide the presently disclosed novel functions and features, all within the scope of the present subject matter.

The presently disclosed SDA system includes AUDITION IP management tool, wherein new IP definitions, existing IP imports, user support, license and royalty management are all managed through a common web portal. The SDA system provides ORCHESTRATE tool builds, whereby system definers may shop and select desired IP to build and manage new designs. Moreover, the presently disclosed SDA system includes REHEARSE simulation and verification, including server side simulation utilizing inherited configuration and operational tasks that are bound to project requirements for mixed signal targeted verification.

Another aspect of the presently disclosed SDA system includes a scalable infrastructure whereby server side SDA capabilities may be easily scaled using data center infrastructure. Open servers are available for 'free' user exploration of available IP, including predefined subsystems and defined designs looking for interest from other potential users. In addition, the SDA system provides business servers that are dedicated for the management of community business relationships, including REHEARSE use, manufacturing audits, IP license agreements and use payments, IP outsourcing, SDA portal customers, etc. The SDA system of the present disclosure provides REHEARSE servers, which are simulation servers for designs committed for simulation and verification services.

Yet another aspect of the presently disclosed novel SDA system includes a set of community access functions. The SDA system of the present disclosure includes an SDA dashboard that steers attention for IP providers, definers, designers, customers, etc.) to where it is required, providing opportunities to manage effective workflows.

Community access functions further include controlled IP and design access functions, whereby owners may remain in control of IP visibility. These functions further permit control of what level (requirements, specs, documentation, users, support, simulation, source, etc.) of access is desire, as well as providing options for sharing or collaboration at all levels.

The SDA system provides a collaborative work environment in which all stakeholders for SDA work may share controlled access to aspects of defining, developing, and bringing a product to market. This measure of simplification enables participation beyond traditional roles and beyond organizational boundaries, when desired.

The presently disclosed SDA system further includes SDA social media functions. Through the SDA social media functions, a common collaborative portal offers the opportunity to mine new business opportunities from IC customers, system developers, IP providers, and manufacturers.

The SDA architecture of the present disclosure further includes IP reuse management functions. The SDA functions of the present disclosure solve an IP market integration and verification problem, thereby significantly providing more value. Delivering SDA through the cloud, as the presently disclosed SDA system provides, presents a way to also manage essentially all of the many complex issues with managing IP reuse.

Considering the benefits of the presently disclosed SDA methods and systems, here is a one stop shop, or single portal for selection, purchase, and management decisions. the result is a highly beneficial instrument and set of processes that simplify and accelerate IP market benefits. by providing up-front data, system definers have technical and cost tradeoff data up-front when building new SDA designs, and are able to 'try before they buy.' Also, they may manage agreements at a glance associated with existing and proposed IP use, and the aggregate effects that may have on IP provider agreements. These agreements may all may be managed through a common portal.

The SDA system of the present disclosure further provides tools that aggregate billing/payments and integrate and manage billing/payment, thereby accounting for IP and device owners with manufacturing and sales channel audit data. The SDA system of the present disclosure affords significantly enhanced operational compatibility. The present SDA architecture addresses compatibility issues for design, test benches, verification, and operation of IP once integrated into a design.

Moreover, the presently shown SDA system provides database defined wrappers. Here, the SDA system generates a database use driven wrapper around IP for integration, containing optimized mode controls, communication, wires, etc. The system presents assertions, monitors, and debuggers. With the SDA system, an efficient monitor and debug capability, including integration assertions, are provided that indicate where use problems might exist.

The SDA system of the present disclosure further provides flexible integration and interoperability. By default, all mode controls, data communication, wire connections are in-silicon configurable, automatically selectively optimized through specification or design case mining from verification. This includes holistic SDA IP support from a web-based SDA user interface. The web-based SDA user interface provides user support and ticket tracking, whereby IP users may obtain documentation, news, and update information on IP. When issues require IP owner support, the site facilitates controlled tracked closure through a ticket system.

In addition, the SDA system includes a provider support portal. The provider support portal includes an IP provider dashboard that allows IP providers to manage IP deployment and support for all their customer users through a common portal, more effectively meeting customer needs.

The SDA system also provides for opportunity mining that may be associated with the web-based interface. There, users may request new IP functionality. IP providers may compete for new business, and design data may be mined to uncover opportunities to optimize new versions of IP offerings.

The SDA system of the present disclosure represents information relating to implementing designs in a relational database form 400-405 with controlled shared access and use by new design stakeholders as well as system design automation tools 100. The SDA system incorporates a preferred multi-agent event-driven method of operation and architecture topology that facilitates automated design generation from libraries of mixed signal hardware and software IP. Database parameter entries for mixed signal IP and designs may be in-design programmable for maximum end system flexibility, or fixed for generating optimized designs. The SDA system enables providing a complete cloud-based collaborative system design ecosystem that provides the capability for users to easily move from concept to new chip design and simulation using only a web browser. Additionally, the ecosystem provides a simplified holistic approach to new design efforts.

Figure 2:
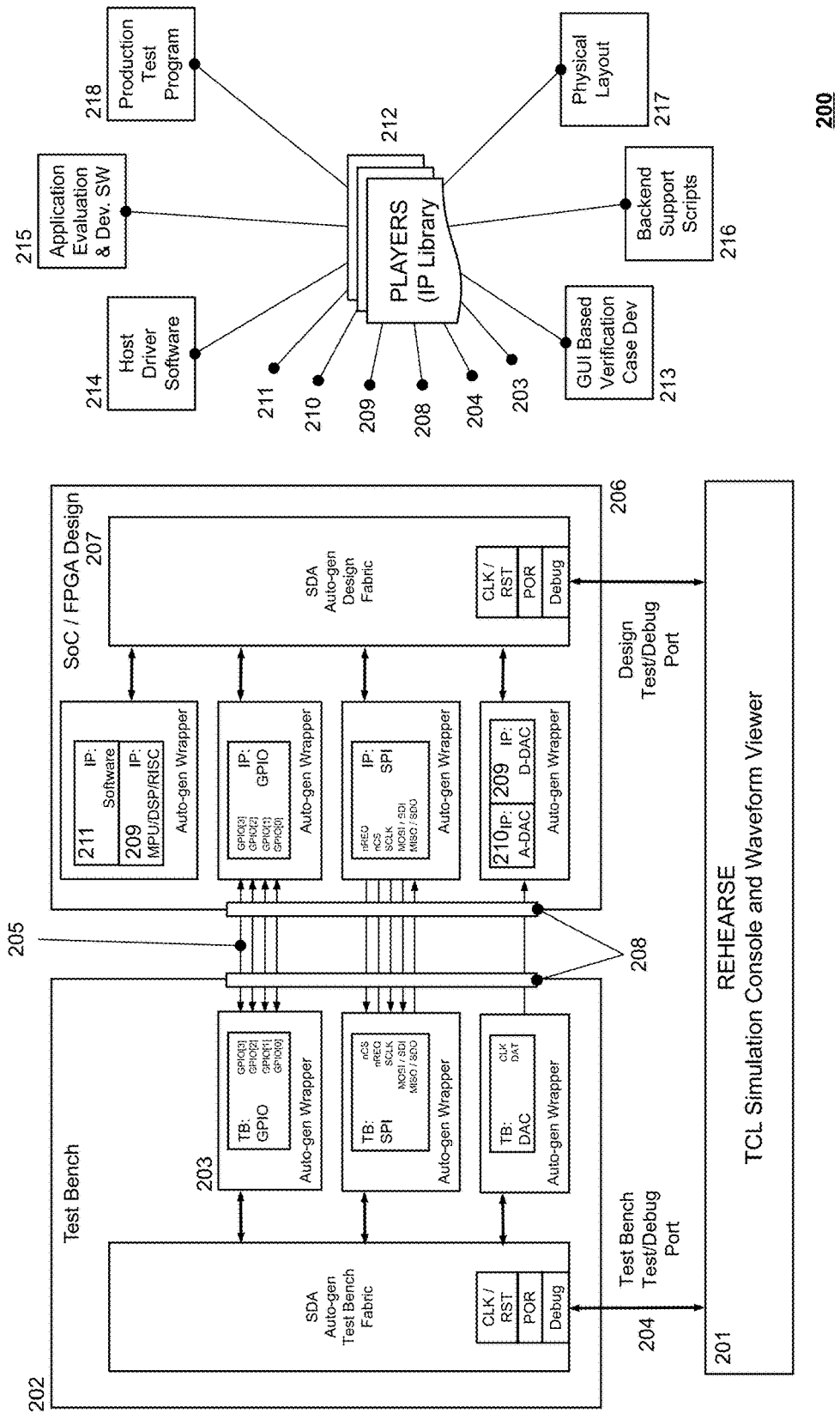
FIG. 2 shows an example design and test bench topology as here disclosed.
Figure 3:
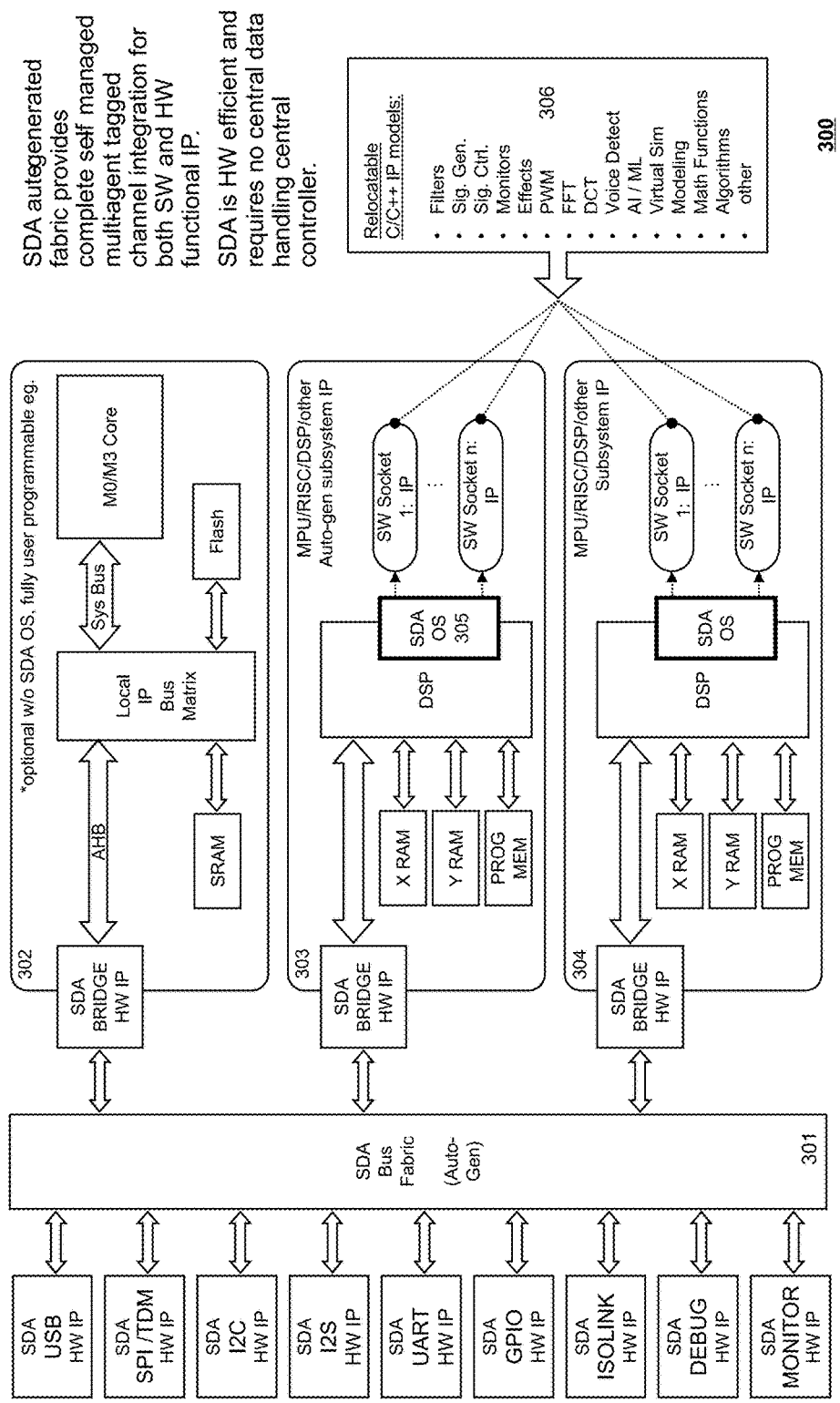
FIGS. 3 through 5 show SDA applied to systems incorporating software IP as within the presently disclosed subject matter.

FIG. 1 shows the web application partitioning 100 for different aspects of performing cloud-based SDA activities performed through the site, and FIG. 2 shows SDA generated example design topology and related IP reuse sockets 200 used in an automated new design build. Upon login, each user is provided information such as access, views, and progress summaries on their DASHBOARD 101/601 according to the needs associated with their role. Users may be system designers that select and utilize IP from the PLAYERS library 102/602 when building their new design 206 using the ORCHESTRATE application 103/603, requirements management, verification, and test users that specify, define, and simulate application specific use cases with the REHEARSE application 104/604, application and new software developers requiring real-time FPGA emulation capabilities through the PERFORM application 105, or IP developers and providers that use the AUDITION application 106/605 to ensure their IP is ready for inclusion in PLAYERS 102/602 for use by ORCHESTRATE 103/603. Additional non-development users may utilize the SDA site 100 for supporting new designs, supporting PLAYERS IP, managing PLAYERS IP licensing activities, and accessing information relating to newly created designs. Also, available from the site is COLLABORATE host OS extension and driver SW 107 to support the use devices created through the SDA site.

Figure 12:
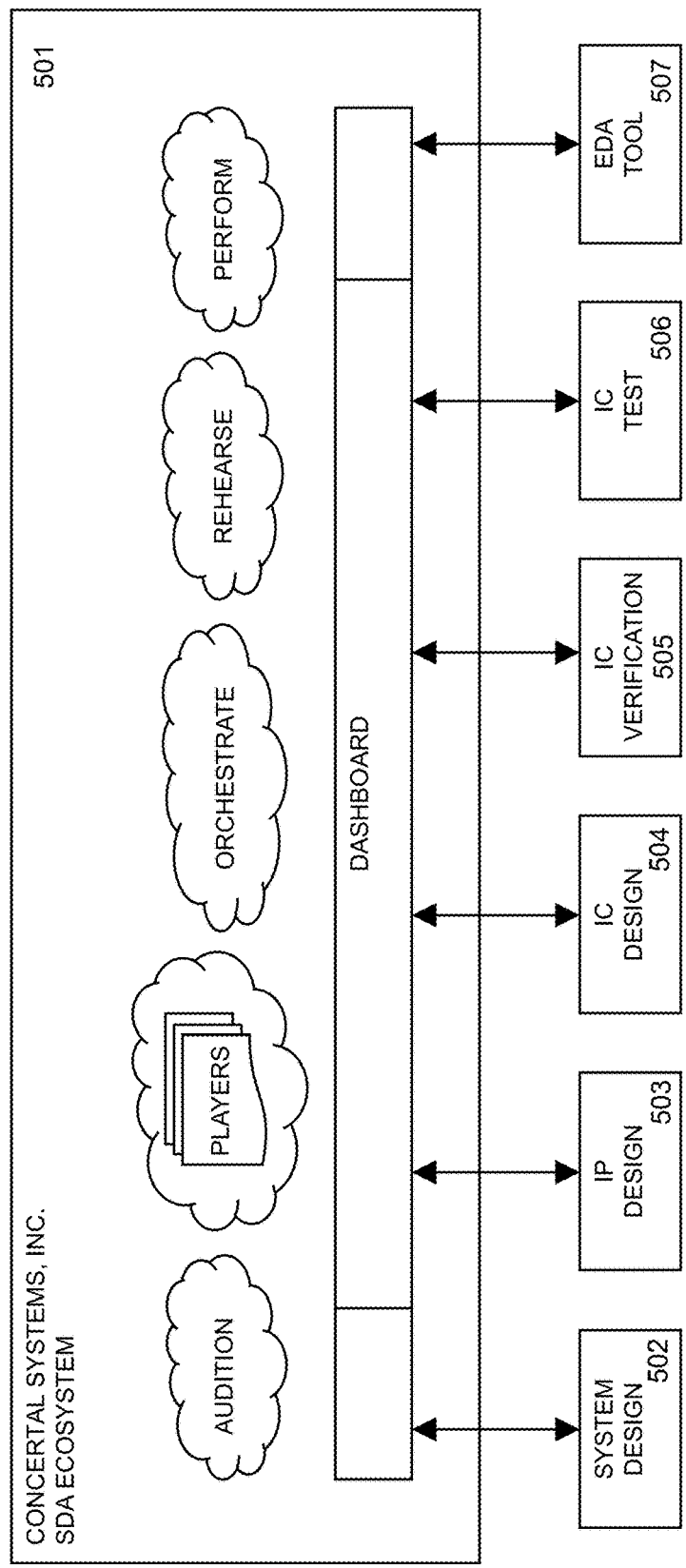
FIG. 12 shows the interfacing of industry functions with the described SDA ecosystem according to the presently disclosed SDA system.
Figure 16:
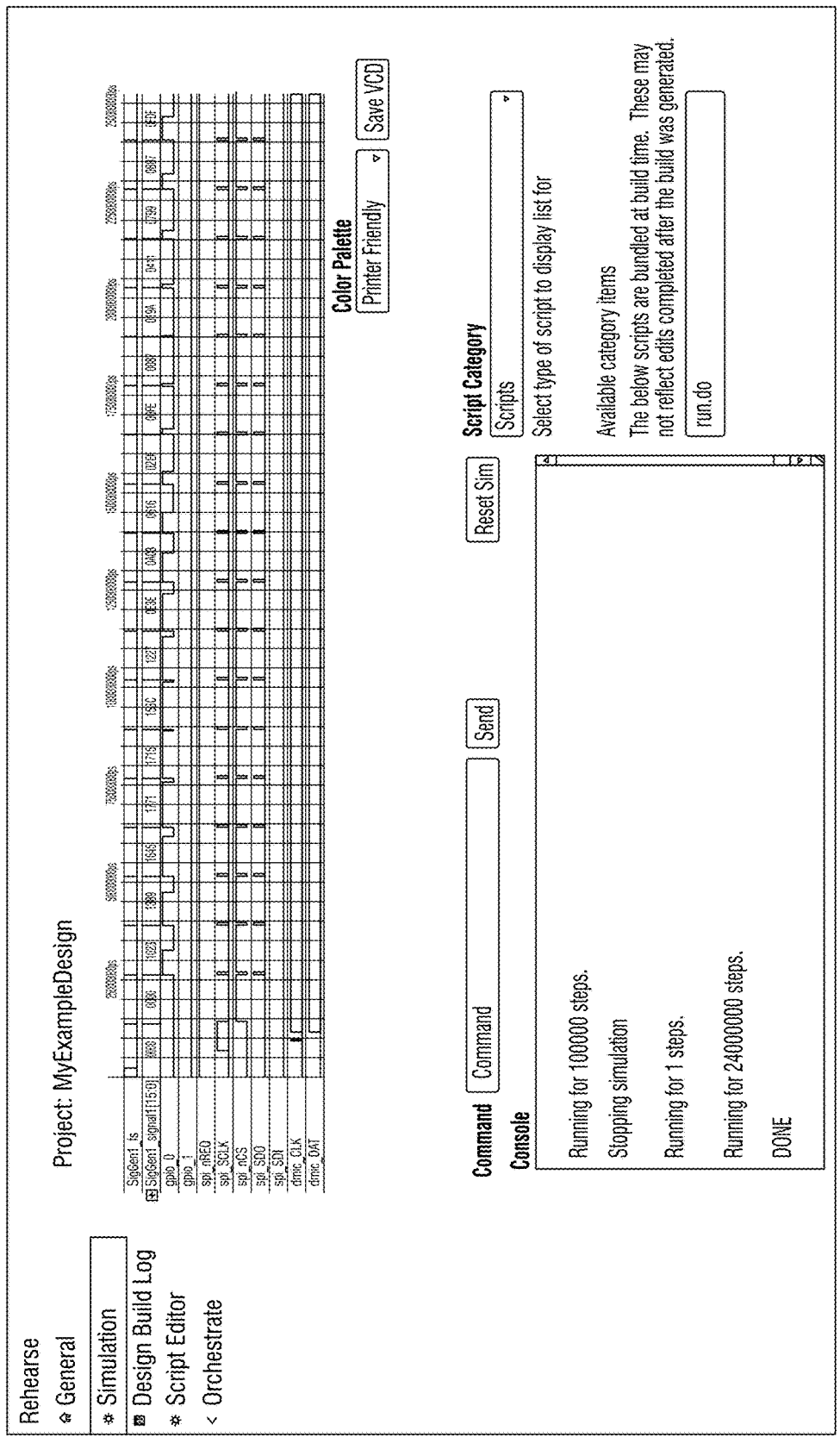

FIG. 12 shows the community tasks 500 interfacing to the cloud-based SDA capabilities 501. System design 502 would be the person initiating and building new ORCHESTRATE based designs from PLAYERS based IP libraries. IP design 503 may import functions to the PLAYERS library using the AUDITION tool, or may examine specifications entered in AUDITION by System design 502 and respond with new IP to meet new requirements. IC design 504 may extract a design specified, built, and verified by system design 502, or may share in the system verification effort by using the REHEARSE capability. IC verification 505 may be a shared responsibility through the dashboard between all stakeholders in a new design, including IC design engineers for the final gate level verification simulations. All stakeholders may share the SDA produced design and simulation engine, including IC test 506 and applying EDA support tools 507. It is noteworthy to point out that each of the tasks 502-507 do not necessarily need to be the responsibility of the same organizations, but may be distributed and/or shared by multiple organizations through the SDA system. Additionally, the presently disclosed SDA ecosystem illustrated with web browser examples 601-605 are provided to web developers through a RESTful API. The API delivers SDA portal functionality to outside organizations or companies so that SDA may be delivered through the websites of those organizations, allowing value-add delivery and access to the common SDA portal. For example, IP design elements for PLAYERS may be provided by EDA, IP, or semiconductor companies, where the SDA system allows them all to be used together in a collaborative practical system with IP from other organizations. Also, system design may be performed by IC companies wishing to develop a new catalog part where the useable models may be made available to their end customers, or by end customer that wish to define a new product from available IP they wish to be considered for manufacturing, which may then be further refined or customized to meet a broader market opportunity.

Mixed signal IP within the PLAYERS IP library 102/212/602 are each made up with any combination of library components such as input/output pads 208, digital 209 and analog 210 circuitries, and software 211. The library 602 may be searched and browsed for determining appropriate functionality for a system designers project needs. IP may be simply selected for inclusion into the desired IC design, analogous to an online shopping experience where items are included into a cart for later checkout.

The ORCHESTRATE SDA application 103/603 is where IP selections for integration are made, with die size and cost estimates (with anticipated IP license costs) may be updated and presented to the user according to their project parameters, such as process and fab choices and anticipated optimization efforts. ORCHESTRATE 603 provides opportunities to further define operational parameters such as mode control settings and registers or input data sink bindings to other IP data source outputs that result in the necessary IP wrapper circuitry being automatically optimized for the intended use, either during the selection process or later.

As user configuration parameter data is gathered or defined, ORCHESTRATE may provide early flags indicating potential integration issues that may need to be addressed, including but not limited to internal HW bus bandwidth issues, target DSP or MPU software instruction cycle utilization levels, estimated power requirements, and interface IP bandwidth estimates. Some issues that arise may be addressed during the system automation build process, such as flagging tagged signal attributes limit conflicts, adjusting wrapper FIFO depths where present, repartitioning functional IP modules into different subsystems, adding additional programmable core IPs when necessary, and repartitioning the division of SW IPs among the programmable cores. However, some may require changes in user selection of IP or even require a user to define IP that may not be currently found in the system.

ORCHESTRATE allows users to define functional requirements for new IP which may be sent to $3^{rd}$ party IP providers for development and inclusion in PLAYERS. IP under development may limit visibility and access as required to meet the confidentiality needs of all users involved. In the case of selecting of specific software processing cores 303/304, such as DSPs, MPUs, or MCUs, may be explicitly selected from PLAYERS by users, or ORCHESTRATE may recommend the most appropriate processing cores for the high-level software functions 306 selected for use by the system design user. ORCHESTRATE automatically builds the design 206 and test bench 202 and user documentation.

Once PLAYERS IP 102 selection is completed and optionally configured through ORCHESTRATE 103, the IP within the integrated design may be verified using simulation efficient models using the REHEARSE application 104, as the PLAYERS IP contain reusable self-test simulation controls 201, generators/monitors 203 to provide IP verification in the integrated design without additional user activity. Additionally, advanced verification environment capabilities (i.e., using VVM or UVM methods) may be included for reuse with PLAYERS IP for performing constrained random verification test activities upon the integrated design.

These capabilities may be used with little or no user intervention, or using some user directives through the REHEARSE interface. Also, useful to users is the ability to use REHEARSE for specifying user directed application specific verification test cases that make up the designs regression list. Using the inherited reusable test bench tasks and commands 213, users may build test cases through text based command lists, web table interfaces, or GUI based configuration and monitoring controls in a schematic like environment.

A directed test case built in REHEARSE specifies the design configuration for data path routing and mode controls of IP and signal generators in the test bench, and the setup of internal and output signal monitors for defining expected outputs of the specified configuration. The list of directed test cases is reported along with the tool self-test simulation results on the verification scoreboard for quickly identifying problem areas. Also, provided through REHEARSE are other viewing options of IP I/O exercise summaries and internal IP code coverage results for self-tests, directed tests, and constrained random tests.

The SDA auto-generated design fabric and auto-generated IP wrappers 207 shown implement the preferred multi-agent event-driven method of operation, where output from IP is presented to the fabric in an identifiable manner, such as a source-based broadcast. The fabric provides all source output communication to all IPs within the subsystem, and sink inputs to IPs are configured to grab the data desired when observed. This method of operation allows communication between IP tools to remain loosely coupled, allowing data path relationships to be defined by parameters in the database and automatically implemented as fixed or configurable circuits within the auto-generated IP wrappers.

IP wrappers also implement the multiplex selection of wire events from other IPs as necessary, as well as configurable mode control registers required by IPs represented in the database that may be optimized as necessary for the design's intended purpose. Together, the implementation provides a hardware interface multi-agent event-based operating system that functions in a 'configure and let it do its thing' principle.

The SDA system provides an integration backbone 301 that provides IP sockets that PLAYERS IP 302/310 are simply plugged in to. The integration backbone contains a control handler that provides configuration control, traffic arbitration, event routing and handling, subsystem bridging, debug port, design for test (DFT) support circuitry, clock and reset control, power management, or any other system functions that may be provided for the user but optionally hidden under the hood to simplify SDA IP integration and verification.

PLAYERS IP 102/212 tools may contain any combination of socket components, including functional software IP tools 306 intended to operate within a programmable hardware MPU, RISC, DSP, or other core 303/304 requiring an OS 305 to provide integration sockets for SW IP. Like the SDA fabric 301, the core processor OS implements a multi-agent event-driven method of operation based on a configure and let run principle as illustrated 350. The method means that SW IP components may obtain their input from any HW or SW IP in the system, and provide output for use by any other HW and SW IPs through configuration.

HW IP wrapper 351 is auto-generated with input sink FIFO 352 that collects desired input bus traffic for SW IP inputs. The multi-agent event-driven operation means that sink traffic may occur at any time and at any order. One of the tasks for SDA OS 354 is to receive and separate the sink FIFO 352 data into separate channel input queues 356 for use by SW IP sockets.

As shown, input queue 0 is reserved for communication with the SDA OS for configuration operational purposes, such as SW code uploads, initializing SW IP mode settings, prioritizing SW IP execution, status monitoring, and other under the hood functional requirements of the core. Software IP 355 inputs obtain their inputs from any input queues 356 or output queues 357, and provide their output to output queues 357 that may also provide data to the SDA fabric through the IP wrapper hardware FIFO 353.

In some cases, it may be desirable for some systems to integrate a programmable core without an SDA OS, such as the M0/M3 core example 302. In this case, the HW IP wrapper bridge greatly simplifies data transfer with the entire SDA system IPs and integrating the core within the system.

Figure 5:
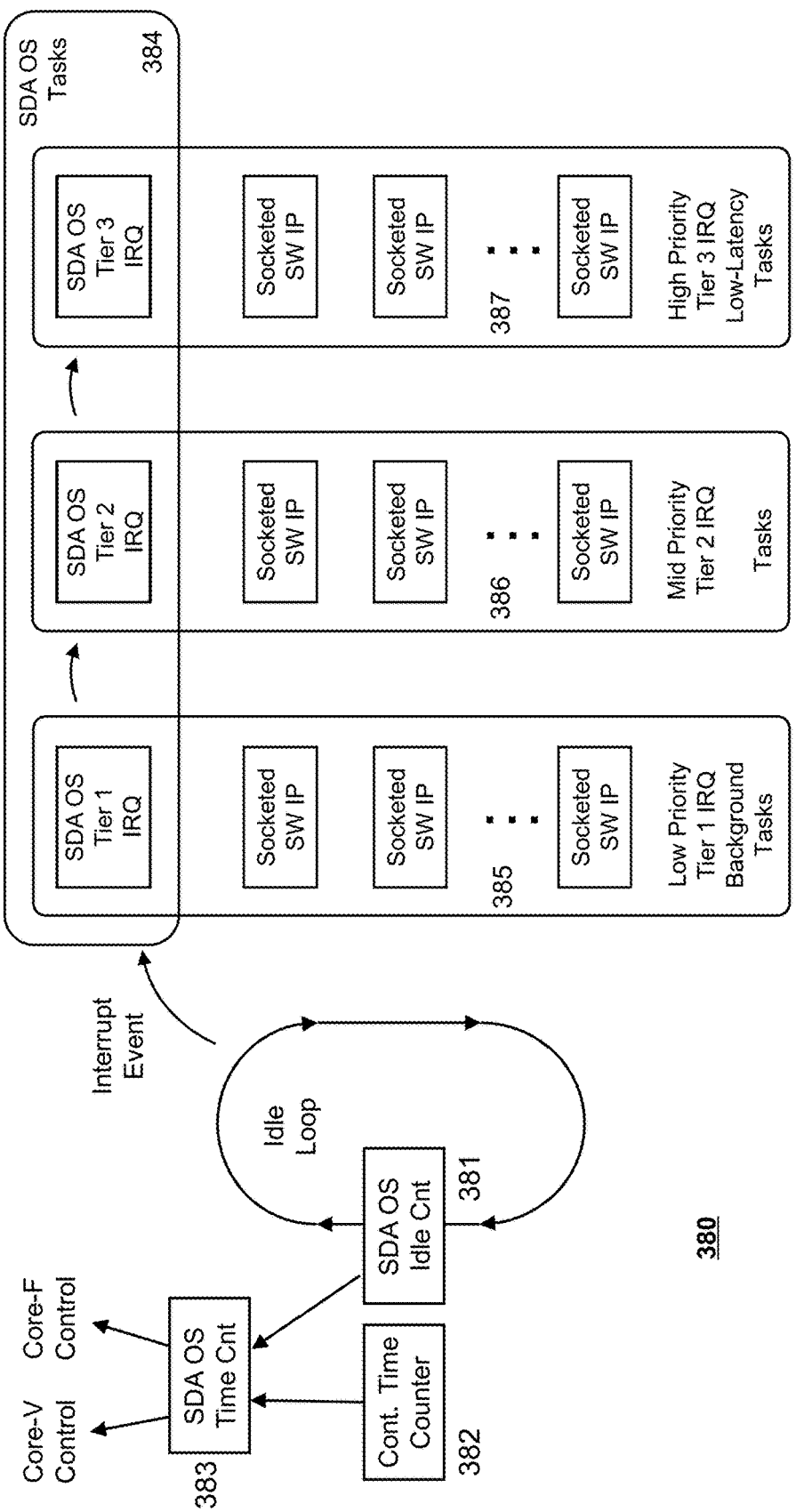
Figure 6:
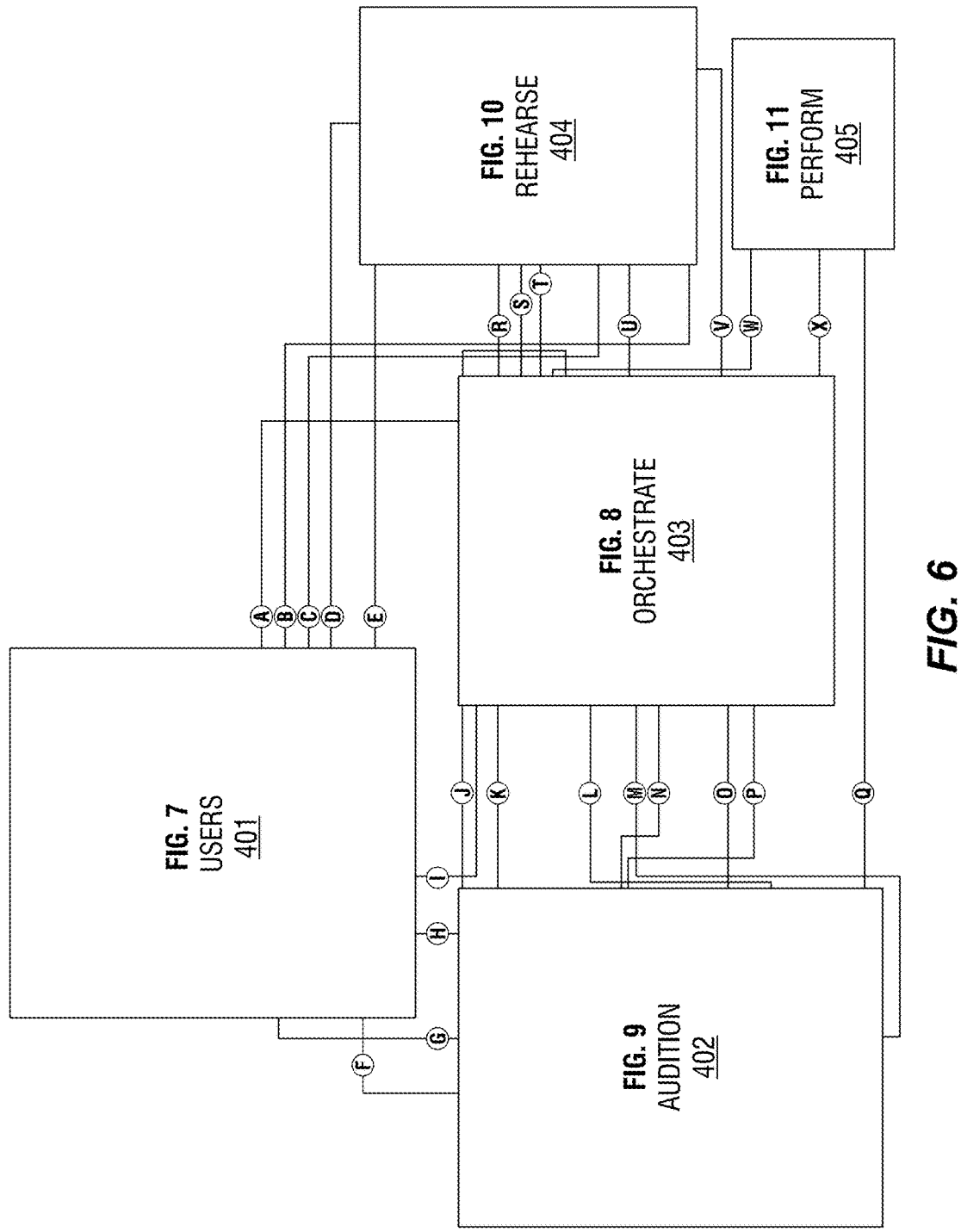
FIGS. 6 through 11 show database schema figures of operational parameters as may be implemented in the present disclosure.
Figure 7:
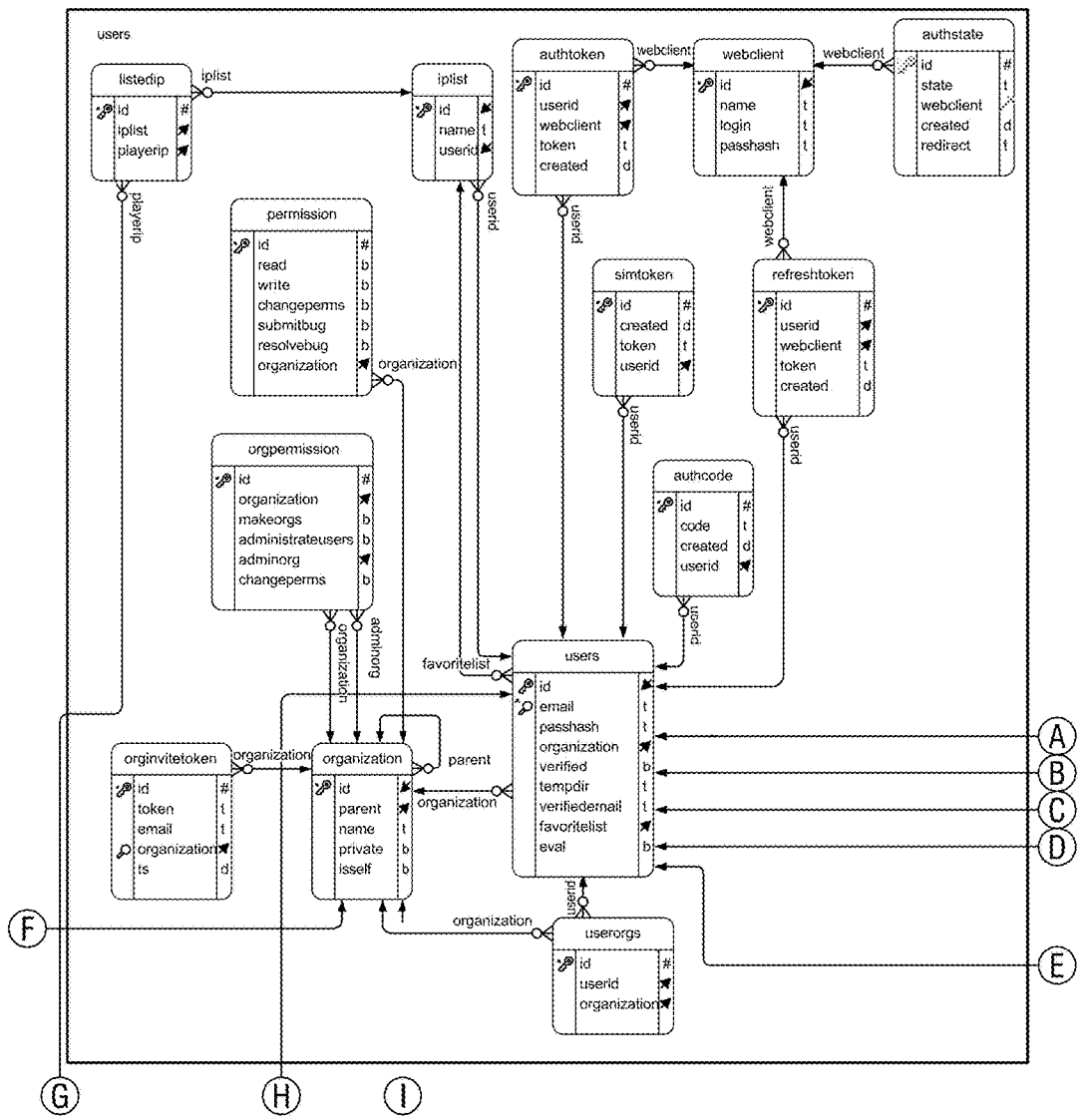
Figure 8:
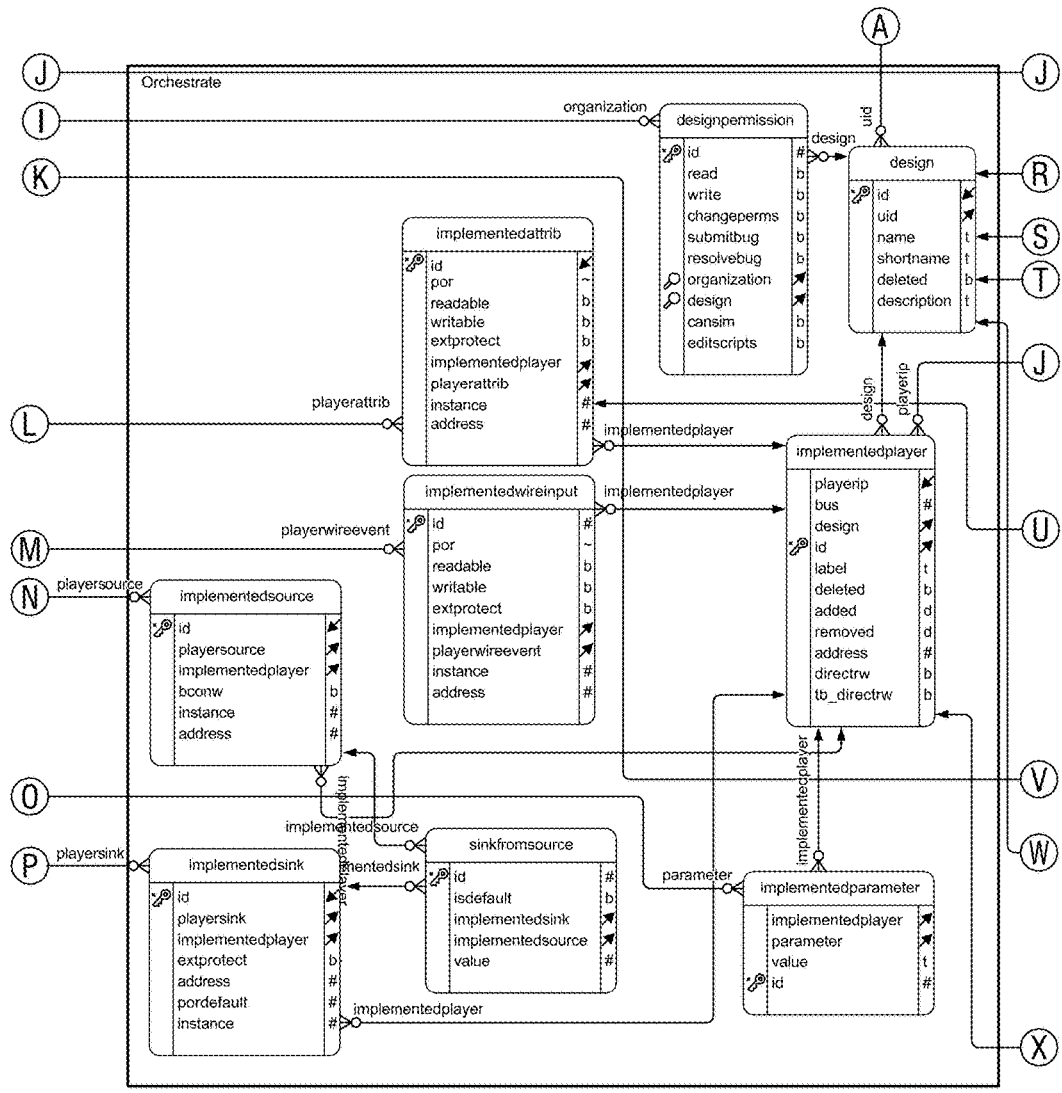
Figure 9:
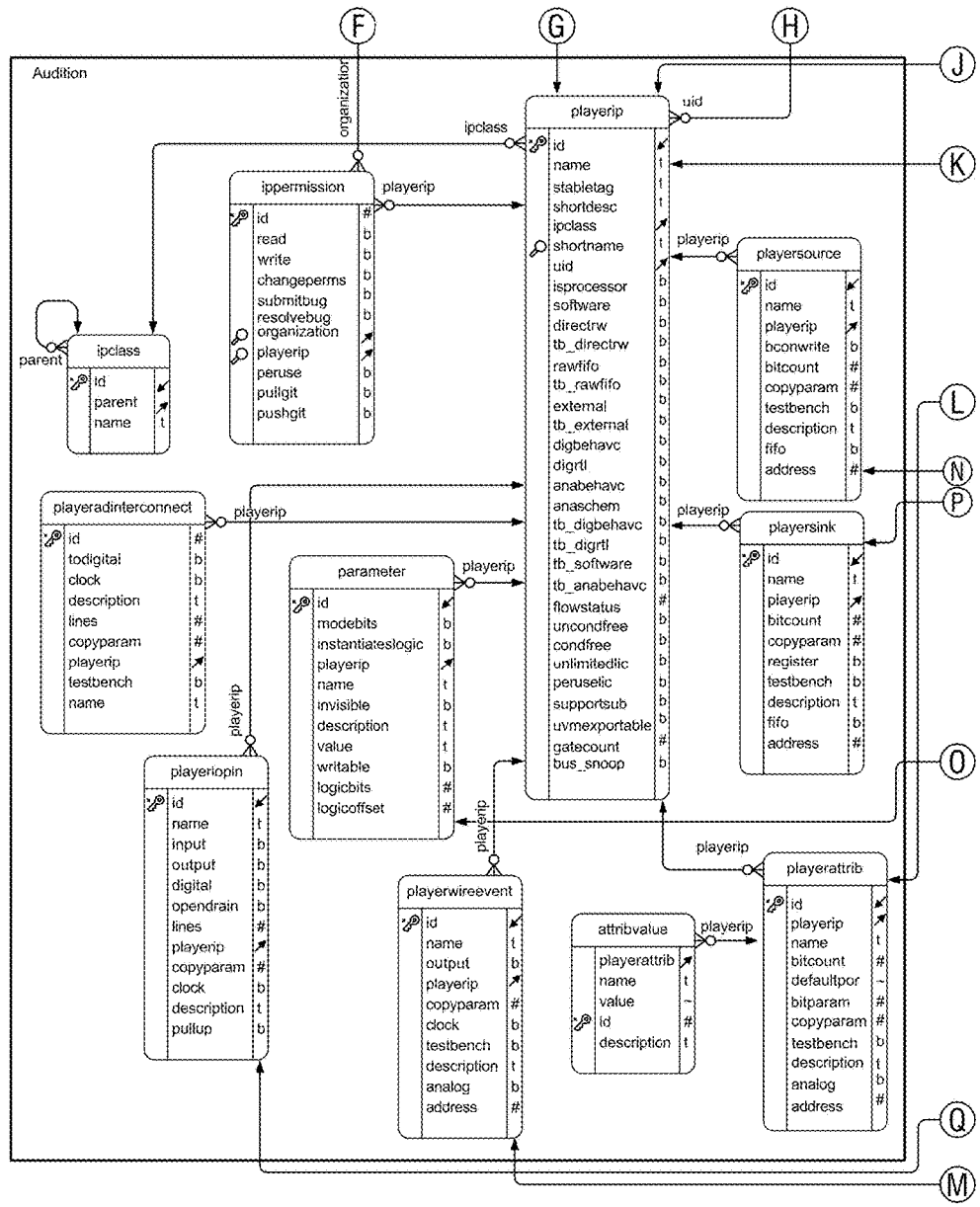
Figure 10:
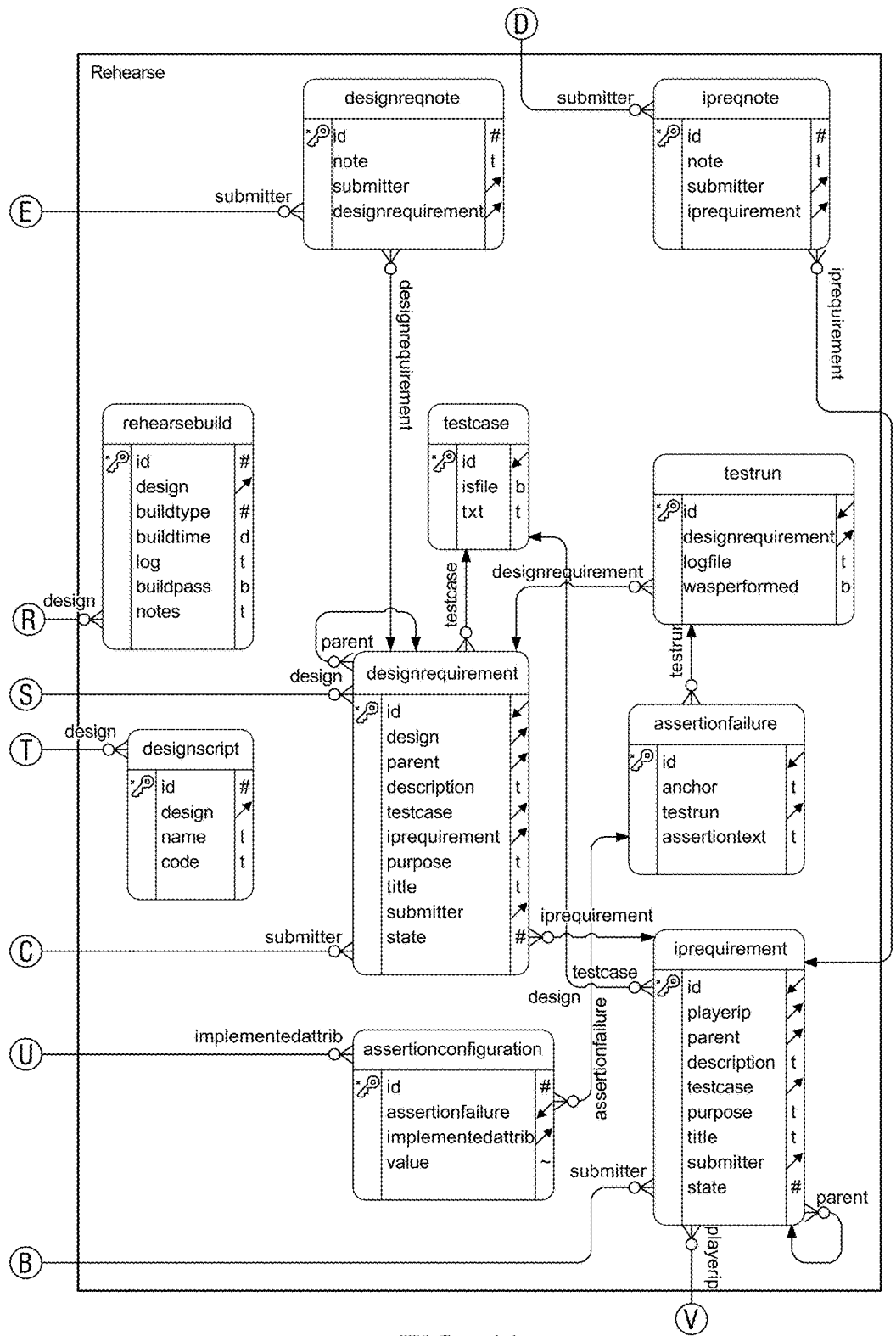
Figure 11:
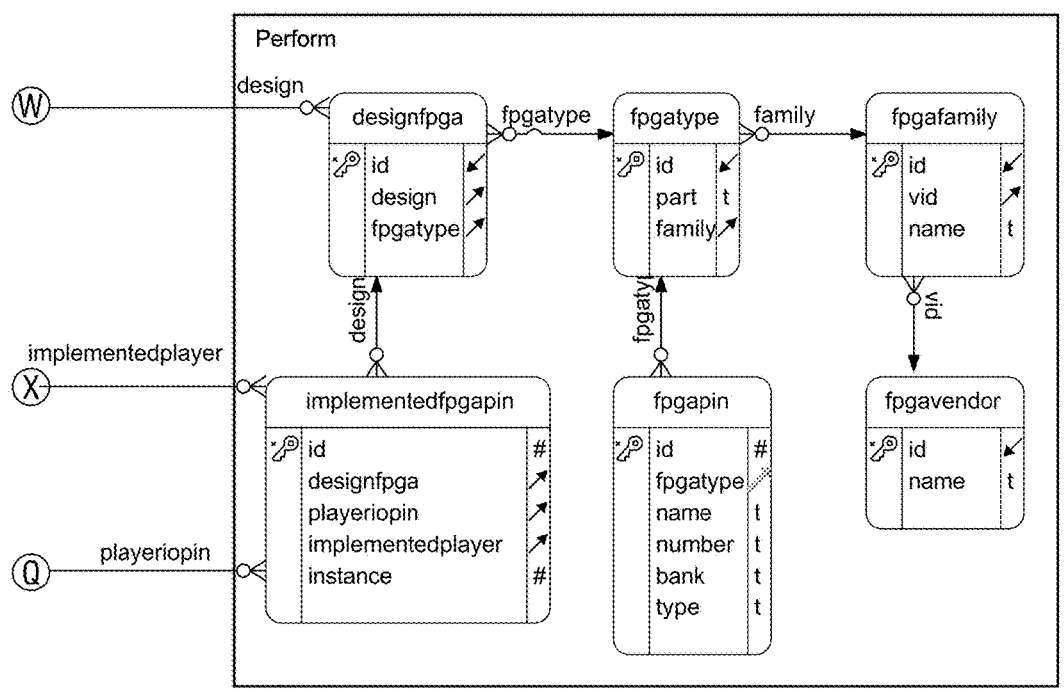

FIG. 5 further illustrates the base SDA OS functionality 380, where an idle loop 381 monitors cycles for comparing to continuous time counter 382 that may control programmable core voltage and core operational frequency 383. By detecting unused idle cycles, the core voltage and operational core frequency may be lowered to save power, or increased when necessary to increase performance.

Idle loop operation is interrupted when HW interrupt events occur or input data is present for SW IP processing to occur. Shown are three tiers of interrupt processing, tier 1 being reserved for low-priority background tasks 385 and tier 3 being reserved for high-priority low-latency tasks 387. Socketed SW IP tools may be independently registered for their required priority 385-387 to minimize dataflow problems within the system.

Figure 4:
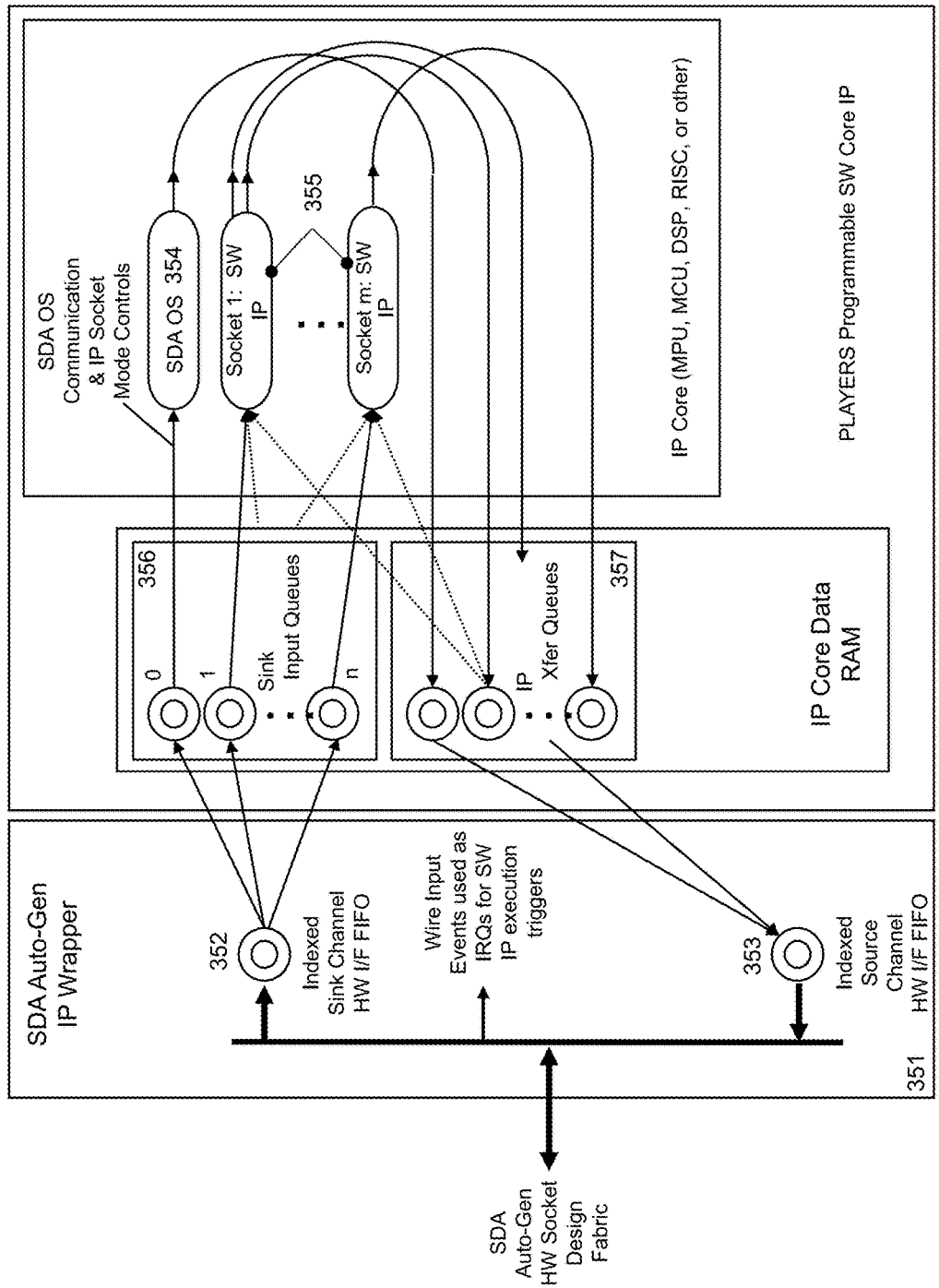

The socketed backbone provides interconnectivity integration of IP, and loosely coupled operational relationships for IP input and output provides operational integration through the configuration of backbone and IP wrapper parameters. FIG. 4 illustrates how integration operational backbone parameters may be represented in a database form using the illustrated database schema of operational parameters 400. With this approach to defining system integration and operation, design and verification efforts are simplified and may be simply defined through tables manipulated with a web interfaces, facilitating SDA.

USERS 401 represents the login to the DASHBOARD 101, providing user specific information regarding the use of the AUDITION 106/402, PLAYERS 102/212, ORCHESTRATE 103/403, REHEARSE 104/404, and PERFORM 105/405 web accessible portions of the cloud-based SDA ecosystem 100. Within AUDITION 402, the parameters that define the configuration of the wrapper to bind connections and operations to an embedded IP are represented. ORCHESTRATE 403 includes the PLAYERS for each design and the further post integration attributes for the use of the IP within the design.

REHEARSE 404 includes the simulation control and expected behaviors for each use case scenario of an ORCHESTRATE design. PERFORM 405 provides the additional information required to drive the design into an FPGA based configuration for emulation.

Following the completion of using REHEARSE 104 to build and verify the design, the configuration data 404 from directed use cases may be collectively analyzed to drive automated optimizations for the final design, selectively and optionally removing IP configuration circuitry not required. For example, each input of an IP may be configured to receive source data or signals from any available IP output, but if an IP input is known to only require data from one or a few sources there may be no reason to include the additional operational flexibility. Or, if an IP has mode controls for a variety of operational settings, those mode controls may be optionally reduced to include only the flexibility necessary in the end design. In such cases, the optimization would require the changing of an IPs programmable register map or IP data wrapper used to integrate to the SDA backbone.

REHEARSE 104 will work with ORCHESTRATE 103 to make the design optimization modifications, regenerate the user documentation, modify the regression run test case controls, and re-verify the optimized design. Optimized subsystem designs may then be introduced into PLAYERS library as a subsystem for further reuse by others if desired.

The SDA system also makes provisions to provide FPGA emulation capabilities of new designs, allowing designs to operate in real time and interact with real world elements. This service is provided by PERFORM 105, an FPGA validation engine that may have a variety of forms including a server-side FPGA emulation platform, an appliance that may be provided to the user for use on a client lab bench, or an FPGA board that may be suitable to be embedded within an OEM product.

For server side PERFORM 105 capabilities, the reusable PLAYERS IP 102/112 contain test bench elements that make use of synthesizable signal generator and monitoring circuits 204 that may be embedded within the FPGA build 202. Control of these models are identical to the verification controls that drive REHEARSE verification activities, allowing REHEARSE verification activities to be easily validated in hardware. Additionally, analog IP 210/212 such as ADCs, DACs, PGAs, mixers, and other functionality may be implemented in PLAYERS with digital synthesizable models to be included in the FPGA emulation build. For example, an analog delta-sigma ADC clocked modulator may be implemented as an equivalent DAC modulator, with input data coming from a parallel digital data word rather than an analog wire.

The digital representation of the signal may be provided from an I2S interface along with a digital interpolation filter that may be included in the FPGA when using emulation for validation. The corresponding test bench signal generate may use types such as Verilog representations for REHEARSE, but be synthesized to provide a digital representation through a serial interface when used by PERFORM. Additionally, with server-side FPGA capability, a USB dongle for signal I/O transfers may be made available to users with signal transfers from a client bench to the remote server performed through a common internet interface.

Signal capture capability may be used to drive input stimulus to REHEARSE simulations as well. For users requiring improved latency between their bench and the FPGA emulating the design, an FPGA appliance may be made available that works with a client version of the PERFORM interface, allowing direct input to the design from external bench sources through the utilization of multiplexers place at 205 that bypasses the synthesized signal generators.

The COLLABORATE universal software driver and operating system extension 107 provides additional capabilities to designs built using SDA. IP targeted to interface with host processors will require host driver software. The COLLABORATE layer is an abstraction layer that mitigates differences in hardware between the IP and the host processor, allowing that driver software to operate directly with the IP without modification.

The IP driver plugs into the COLLABORATE layer, and through that layer communicates with the IP regardless of how the host processor is connected to the presently disclosed solution. COLLABORATE tunnels through physical connections such as SPI, I2C, PCI Express, but also may be used when the host processor is embedded within the presently disclosed design and connected directly to the presently disclosed bus.

COLLABORATE may also be used to communicate across network boundaries, allowing the customer to write software and test it using REHEARSE and PERFORM services. COLLABORATE also provides sockets for IP evaluation software, further extending IP reuse into the host past the driver interface.

The SDA system includes extending the method of operation using event driven operations for backbone operational integration onto protocols for standard user interfaces that utilize identifiers for broadcast data transfers. This allows users to configure the part to know what information they are interested in, and then the information coming to an external host in an identifiable way when information is broadcast eliminating the need to actively extract data in response to interrupts. Another benefit is the standardization of the extensible and flexible host driver.

Once the SDA site is used to complete the high-level design and verification, the design is ready for use in a system for FPGA use, or may be handed off to silicon manufacturers or providers to complete the backend flow and realize a final product for the system design user. It is important to realize that the SDA system is also capable to provide benefits to automate much of the back-end flow effort as well. For instance, PLAYERS IP 212 may contain reusable backend support scripts 216 for streamlining tasks such as logic synthesis and timing closure, physical layout blocks 217, performance test program and pattern generation scripts 218, or even the actual test program data 218 for an IP if the IP was not touched and further optimized since its last use.

Figure 18:
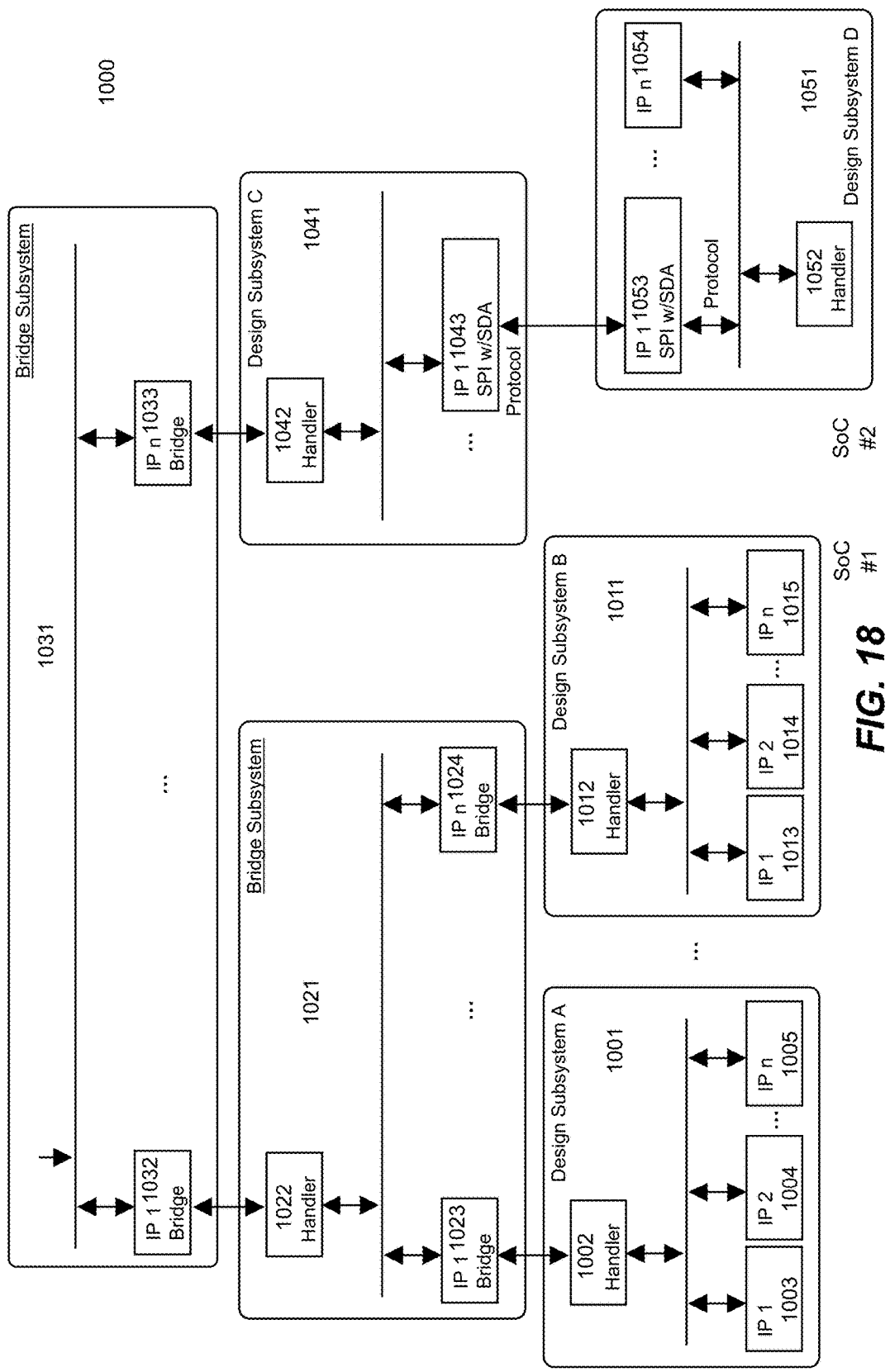
FIG. 18 shows SDA subsystem bridging within the scope of the disclosed and claimed subject matter.

FIG. 18 shows a subsystem bridging example topology 1000, where SoC #1 illustrates subsystems A 1001, B 2011, and C 1041 networked through auto-generated bridge subsystems 1021/1031, as well as networked to SoC #2 through IP named SPI w/SDA Protocol 1043/1053. The example embodiment uses a subsystem Handler IP 1002/1012/1022/1023/1042/1052 that includes an optional bridge for interfacing to another subsystem's Bridge IP.

Handler 1002 may be configured for transferring specific design subsystem A 1001 source broadcasts to bridge subsystem 1021 through bridge IP 1023, where the source based address will be translated to a bridge IP 1023 source based address. Using this scheme, a single output from any IP source in the entire system may be used by by one or more of other IP sink inputs on one or more design subsystems within SoC #1.

If an interface IP, such as the SPI w/SDA Protocol 1043/1053, may include a tagging mechanism to identify data, data routing may continue across chip boundaries, allowing any IP to gain input from any other IP within the entire distributed system. This method of operation provides an inherent NOC that may self-manage data flow and also operate as a NBC.

When combined with configurable sink listening registers in the SDA IP wrappers, designs include all the hooks necessary to monitor and extend functionality off chip. Additionally, when applying artificial intelligent (AL) machine learning (ML) to existing system operations, any relevant data within the entire NBC system may potentially be used by simply adding AI ML functionality throughout the system. Since all HW or SW socketed IP functions operate in a loosely coupled fashion, robust and flexible overall system operation is realized, including disconnecting and/or dynamically changing component makeup on the fly during system operation.

Design database parameters may be implemented as in-system configurable with operational bounding to allow AI engines to adapt system behavior. Additionally, mission critical and safety related system designs for applications such as autonomous driving vehicles or medical related devices may easily implement IP with health check monitoring and reporting, broadcasting status to reporting and failsafe system control mechanisms.

In light of the above description, the following provides a description of the use of the SDA system of the present disclosure. The description begins identification of a use provisions table as appearing in FIGS. 19 and 20. The delivery of SDA capabilities as described in the SDA system provide all stakeholders of a new SoC/ASIC/FPGA design development effort a common interface to efficiently collaborate on the common project effort. Shown in the table of FIGS. 19 and 20 are some examples of respective roles, and what the delivery system of SDA is able to provide for each. Normally, the user roles are organizationally separated with the tasks and workflow of each responsibility being partitioned away from other roles, making practical collaboration difficult. Shown in FIGS. 19 and 20 are how SDA database driven design may positively impact each stakeholder's role.

The presently disclosed SDA system may be implemented utilizing standard computing hardware and standard and custom software packages using a computing server as the base hardware. The server hardware consists of processor, memory, hard disk storage, and network connection. The processing power and memory combination should be adequate in order to provide computational and information queries, as well as handle the web services for multiple users at a time. The hard disk space should be adequate to contain the core database, web files, and temporary workspace for the designs and simulations. The server used for the implementation of the current SDA system utilized four, quad-core processors, 48 GB of memory and two 500 GB hard disks. The software components described below operate on the previous described hardware to achieve the implementation of the SDA system. The software components below describe SDA system components that are standard available components, not customized by Presently disclosed.

An exemplary server operating system may provide the necessary components, include (1) The Make build system, (2) GCC/G++ compiler toolchain, and (3) Chroot. The Make build and GCC/G++ compiler toolchains are used to build the simulation program component of the SDA system. The Chroot functionality confines the simulation program to prevent hostile components from affecting the larger system. This feature locks the simulation in a proxy-system which prevents the most malicious behaviors. For the purposes of this SDA architecture, Gentoo Linux was chosen to meet the above criteria.

The web server software should execute active/scripted content necessary to provide database driven form content to the user. Presently disclosed uses PHP to provide server-side active content to the user, and JavaScript to provide client-side active content. For the described SDA system, Apache web server is used for the web server implemented on the server.

The SDA system uses a server database at the core to store and manage information provided by the user and source the information back to the user and various process/programs that make up the SDA system. There are several options for SQL databases that all provide similar options and features. To meet the above criteria and implement the revision system used in the SDA system, the PostgreSQL database is used.

Version control software is utilized in the SDA system to record the changes and maintain a history of the files that make up the intellectual property code used in design tools and system designs. It provides the ability to track changes and recall previous versions of the files that would not be available without the versions control in place. Version control is achieved for both the upload and download aspects of the SDA system. Git version control software is used in the SDA system to satisfy the version control component of the SDA system, such as providing a container for an IP, and a design compilation build container that allows access to executable simulation code and REHEARSE simulation scripts.

In order to compile the System Verilog code into C++ code for simulating the system designs created in the SDA system, a compiler must be utilized. Verilator, a free software tool, is utilized in the SDA system to achieve the desired form of simulation system that may provide data across a web socketed connection.

In order to access the information store in the database and interact with the various processes of the SDA system, a user interface is required. The user interface must provide user input, validation, feedback, and display results/information from the SDA system and its processes to satisfy the needed functionality. While a compiled software interface meets the user interface requirements, a web-interface was chosen to negate the need of the user to install software to their personal computer/device. To implement the web-based user interface, the Bootstrap framework was utilized to implement the web-pages and display along with custom JavaScript and PHP code.

The software components below describe SDA system components that are customize developed software components by presently disclosed SDA system. As previously described, the user interface is required to provide user input, validation, feedback, and display results/information from the SDA system. To implement the web pages used to achieve the user interface, JavaScript and PHP programming code are utilized in the design of the user interface page. They connect to the API to display and collect data to/from the user and transmit user data to the API.

To exchange data with the database, an API is implemented for this SDA system. It allows for the connection of various programs to the database information in a controlled and consistent methodology.

The WebSocket server provides a connection between the design simulation and user interface components of the SDA system. The WebSocket server is required to authenticates the user, start simulation processes, and transmit simulation commands and data. The WebSocket server uses the NoPoll library in order to manage the web socket connections.

In order to provide design simulation, the SDA system must compile the system design code into a complete simulation program. The simulation compiler previously described, does not generate a complete program and therefore custom wrapper code was written to complete this action. The custom wrapper code additionally integrates a TCL library to provide execution of scripts in the final simulation program. The wrapper code could just as easily incorporate other scripting libraries such as Perl or Python as well.

Presently disclosed SDA system provides for the design of complete systems from reusable design block/tools. These tools are combined together with system specified parameters to achieve the final system design. To compile the tools into the final design, multiple scripts were written manage the creation of files or create individual files. The generation scripts create the chip design that may be processed with Verilator to create a design simulation or download as the design end-product code.

In order to achieve protection of customer design tools and systems and properly log and retrieve data from the database, the SDA system must provide proper authentication of the user, such as an Apache Plugin-PostgreSQL Authentication Module. An Apache server plugin tool was written to provide authentication of users accessing Git over HTTP and HTTPS. This provides required security for intellectual property served via the Git revision control system.

In use, SDA system coordinates the use of the DASHBOARD, AUDITION, PLAYERS, ORCHESTRATE, and REHEARSE tools as follows. DASHBOARD serves for communication, advertising, and support, as well as provides focus site access for all of the SDA system. The AUDITION tool provides IP Definition, specifications, specifications, import and management functions in providing for IP management. The PLAYERS tool presents an IP library to provide IP information & access. The ORCHESTRATE tool provides design definitions, specifications, and management, in providing design management functions. The REHEARSE tool provides design compilation and simulation to enable design generation and simulation services.

With the functions these tools perform, there are services of importance according to the roles of the various SDA system users. Here, the various users include system designers, project managers, IC/FPGA designers, IP designers, verification engineers, validation engineers, DFT engineers, back-end flow engineers, application engineers, IP providers, semiconductor suppliers, and system suppliers.

System Designers set top-level specification and high-level design of new systems, SoC devices, and FPGA based designs. Project Managers manage the design development progress. IC/FPGA designers handle design and implementation of tangible semiconductor based products that may contain a combination of digital and analog circuitry and embedded software. IP designers take care of design and implementation of mixed signal tools for use within designs and systems. Verification Engineers are responsible for ensuring designs reliably meet their intended purpose before being released to build. Validation engineers a responsible for ensuring designs operate as required within the systems they are intended for. DFT engineers handle "Design for Test" activities to provide implemented features that ensure new products are screened to ensure quality on shipment. Back-end flow engineers take care of synthesis, layout, timing closure, mask prep, etc. to bring designs from mixed signal simulation to buildable product. Application engineers provide product support for applying new devices to particular customer and application needs. IP providers are businesses for providing IP to semiconductor designers/suppliers. While, semiconductor suppliers are businesses for providing semiconductors to system designers/suppliers. And, system suppliers are businesses for building and shipping products that use semiconductor SoC/ASIC/FPGA devices.

For system designers, the DASHBOARD enables collaboration on new product development opportunities and proposals. The DASHBOARD further makes possible managing competitive IP and design development efforts, communicating with all new device stakeholders, and tracking/reporting project development status. For system designers, the AUDITION tool collaboratively capturing/documenting customer mixed signal IP requirements, providing C/C++ behavioral IP prototyping, and sharing IP needs with IP designers and providers. The PLAYERS tool permits system designers to browse visible IP and designs, organize interesting IP into personal lists, and obtain IP for use in designs. The ORCHESTRATE tool supports system developer efforts to define and document new conceptual designs, specify collective operation system specifications, share design definitions with other project stakeholders, and make rapid design spins/modifications. The REHEARSE tool supports system designers to quickly generate automated builds of highly flexible and configurable proof of concept and prototype designs, share simulations with other project stakeholders, and simulate quickly with inherited IP task/test scripts.

For project managers, the DASHBOARD enables communication with all new device stakeholders and tracking/reporting project development status. The REHEARSE tool supports project managers to track and manage designs to meet all of technical requirements and specifications.

For IC/FPGA designers, the DASHBOARD enables managing technical alternatives with system and IP designers, and communicating with other design stakeholders and IP providers, as well as tracking/reporting design development status. For IC/FPGA designers, the AUDITION tool provides access to IP details when necessary and allowed by IP providers/owners, as well as provide design related information to IP providers for others to use. The PLAYERS tool permits IC/FPGA designers to browse visible IP alternatives for designs and obtain IP for use in designs. The ORCHESTRATE tool supports IC/FPGA designers' efforts to obtain usable definitions from system designers, as well as to further define IP and design relationships for automated optimization of design integration circuitry. In addition, the ORCHESTRATE tool supports IC/FPGA designers' efforts to optimize system partitioning and IP form for operational optimization.

The REHEARSE tool supports IC/FPGA designers to quickly generate optimized automated builds of final designs suitable verification and back-end flow task handoff. In addition, the REHEARSE tool supports IC/FPGA designers to write targeted simulation test cases for functional design review and sign-off, as well as to share simulations with other stakeholders as necessary to facilitate quick problem resolution.

For IP designers, the DASHBOARD enables obtaining IP request opportunities and providing technical support to all IP users. The DASHBOARD enables communications with IP information to all IP stakeholders, as well as the ability to track/report IP development status.

For IP Designers, the AUDITION tool allows obtaining new IP descriptions, specifications, and requirements, as well as to upload new and existing digital/analog circuit designs and/or embedded software functions with required test bench support. For IP Designers, the AUDITION tool provides technical updates and tiered access to others as needed, conditioned upon whether there is necessary permission provided.

The PLAYERS tool permits IP Designers to release and make IP available for use in designs, as well as protect IP details, allowing options for others to use IP without exporting IP. The ORCHESTRATE tool supports IP Designers efforts to create test designs for verifying IP operation in auto-built SDA based systems, as well as to provide test designs for evaluation by prospective users.

The REHEARSE tool supports IP Designers to simulate IP to ensure proper functionality, as well as share technical simulation builds for evaluation by others and mixed signal simulation scripts for use by System and IC designers.

For verification engineers, the DASHBOARD enables tracking/reporting verification development status. For verification engineers, the AUDITION tool provides IP mixed signal test benches and inherits in-system IP test scripts, as well as automated scoreboard specification/feature inheritance functions. The ORCHESTRATE tool supports verification engineers' efforts to uses designs with mixed signal test benches, while inheriting integrated verification envelopes and functional constraints. The REHEARSE tool further supports verification engineers to quickly generate automated builds of core assertion based designs, test benches, and IP access tasks, as well as share mixed signal test cases for review by design.

For validation engineers, the DASHBOARD enables tracking/reporting project development status. For validation engineers, the AUDITION tool provides IP functional FPGA ready test benches and permits applying inherited simulation IP test scripts to emulation and silicon evaluation. The ORCHESTRATE tool supports validation engineers' efforts with functional FPGA ready test benches and design, providing emulation capability with common simulation scripting environment. The REHEARSE tool supports validation engineers with a REHEARSE script interface to perform FPGA emulation running on server or client bench. This has use to validate same verification scripts from REHEARSE running emulated design or final silicon design.

For DFT engineers, the DASHBOARD enables communication with all new device stakeholders, as well as tracking and reporting project development status. For DFT engineers, the AUDITION tool provides a common IP wrapper interface with DFT features to standardize DFT flow, as well as options to extend DFT reuse to IP based vector sets. The ORCHESTRATE tool supports DFT engineers' efforts with a common DFT interface for IPs through SDA Fabric allowing streamlined DFT flow.

For back-end flow engineers, the DASHBOARD enables tracking and reporting back-end development status. The AUDITION tool provides back-end flow engineers placeholders for modularized backend tool scripts for reuse after design handoff. The ORCHESTRATE tool also supports back-end flow engineers' efforts with automated integration fabric provides standardized clock, power, operational timing, architecture to streamline backend flow.

For application engineers, the DASHBOARD enables tracking and reporting customer support issues for designs and their used IPs. The AUDITION tool provide application engineers with updates for future uses of IP that address in-field issues. The PLAYERS tool permits application engineers to easily upflow to system and IC designers to incorporate issue fixes in future parts. The ORCHESTRATE tool also supports application engineers' efforts with automated user documentation generation. The REHEARSE tool supports application engineers to quickly generate builds suitable for FPGA based pre-release evaluation systems, or FPGA based benches for final silicon evaluation tools.

For IP providers, the DASHBOARD enables tracking and reporting the use and support of IP and the auditing and billing of IP customers, as well as new IP opportunity mining. For IP providers, the AUDITION tool allows IP use without providing IP details. The PLAYERS tool supports IP providers' efforts to advertise IP for use. And, the REHEARSE tool supports IP providers to provide browser IP simulation for evaluation.

For semiconductor suppliers, the DASHBOARD enables tracking and reporting use and support of used IPs, even from different vendors, as well as tracking and reporting auditing and royalty payments. This includes single payments with the SDA system of the present disclosure managing IP vendor payments. The DASHBOARD also supports new device opportunity mining.

For semiconductor suppliers, the AUDITION tool manages internal IP and ensures external IP compatibility. The PLAYERS tool permits semiconductor suppliers to advertise needs for IP. The ORCHESTRATE tool supports semiconductor suppliers' efforts to automatically generate highly flexible and extensible designs, as well as to involve outsiders to collaborate with your design flow. The REHEARSE tool supports semiconductor suppliers with browser design simulation for evaluation.

For system suppliers, the DASHBOARD enables •Track/report support of both device designs and the IP within them, regardless of providers.

A technical aspect of the present disclosure includes providing methods and systems for SDA of mixed signal electronic circuitry including embedded software designs for creating ASICs, sub-systems, and SoCs. The SDA system described extends IP reuse beyond the circuit and stand-alone verification capabilities that are common practice today which limit the benefits of reuse. By solving the integration problem first in a loosely coupled manner, complex mixed signal SoC devices may achieve higher levels of IP reuse with push button ease through the cloud, significantly improving time to market, design resource limitations, risks for first time silicon success, and the tasks of managing business multiple relationships of IP providers. SDA generated designs use a multi-agent method of operation, creating powerful and flexible designs that provide both NOC and NBC for distributed system operation, and enhanced non-intrusive in-system monitoring for mission critical and safety related applications. The method of operation also eases integration of AI and ML functionality.

Another technical aspect of the present disclosure includes methods and systems for SDA of mixed signal electronic circuitry including embedded software designs that enable the system developer to build and simulate new designs in minutes using SDA. The disclosed subject matter provides programs and/or scripts that automate the generation wrappers from system integration database entries for mixed signal circuitry and software IP tools. The presently disclosed methods and systems provide methods of operation able to present outputs in an identifiable manner and implement configurable or fixed input select control circuitry or software for tool inputs. From this derives assembling the tools as a system through a NoC (Network on a Chip) and software OS implementation. The present disclosure, thus, provides programs and/or scripts that compile the generated design and test bench, and execute inherited simulation stimulus and self-checks from the IP tool containers.

The disclosed configuration architecture allows this to be either inherited IP script or database driven. Here it is convenient to systematically collect and store wrapper simulation data so that it may be analyzed and drive database entry optimizations for a design based on the way it's used in verification. Script based testing capabilities are synergized so the same scripts may be used to operate Rehearse siulations for verification or Perform emulations for validation.

The disclosed subject matter also provides relational database functionality. Here, mixed signal circuitry and/or software tool design files are organized, stored, as IP containers and accessed using a version control system such as Git (/git/) in a usable form for accomplishing SDA. This SDA system provides a common integration and method of use allowing systematic implementation for all aspects of IP reuse that may be represented in database form from the container, and working with the relational database and code generators.

Yet a further technical aspect of the present disclosure includes a system architecture whereby data and signals may be flowing between mixed signal hardware or circuitry and/or software tools, which may be implemented with IP source identifiers (source-based addresses, indexes) so that tool inputs may be obtained through configuration selects implemented in HW IP or SW IP wrappers, and further so that configuration information may be represented in a relational database form. Configuration selects are implemented as system user configurable or fixed configuration settings from the database. Source identifiers may be kept as absolute (unchanged) or relative (modified as it flows through connected subsystems). Integrated operation is accomplished as a "configure input selects and let it work" manner.

A yet further technical advantage of the presently disclosed subject matter includes the ability to support a cloud-based collaborative environment. The subject matter here disclosed requires no software installation. Using a cloud-based shared environment for all stakeholders of a new design effort, the present SDA system provides a cloud-based IP tool for representing IP in a database form that facilitates automation. The cloud-based IP tool here disclosed manages all IPs owned/controlled by a user/group for design, support, and/or business management. The presently disclosed cloud based design tool enables defining a design and an associated test bench, including the IP that the design uses and the configuration of each of the employed IP tools. Still further, the cloud-based environment here provided enables a cloud-based simulation tool for verifying circuitry and software mixed signal designs.

The detailed description set forth herein in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

We claim:

1. A method for system design automation (SDA) of mixed signal electronic circuitry and software, comprising the steps of:
   generating a networked plurality of mixed signal circuitry and software sockets for instantiating from system integration database entries for mixed signal circuitry and software functional IP module blocks, further comprising the steps of:
   presenting event wire and communication data outputs of hardware and software functional IP with identifiers according to output schema;
   implementing configurable input select control circuitry and/or software for providing inputs of hardware and software functional IP using event wire and communication data output identifiers according to input schema;
   implementing configurable mode control registers, memory contents, and/or parameters for providing functional IP module block functional modifiers according to mode schema;
   assembling said mixed signal circuitry and software wrappers into an SDA generated design using a combination of network on a chip and/or software operating system and/or network beyond a chip to allow functional IP modules to operate together as a system.

2. The method of claim 1 for automatically generating the design from a plurality of predetermined programs or scripts.

3. The method of claim 2, further comprising the steps of automatically executing a plurality of inherited scripts providing stimuli and self-checks from a set of predetermined IP module containers for verifying through simulation and/or validating through emulation implemented IP modules within their integrated form for automatically generated designs.

4. The method of claim 1, further comprising the step of implementing hardware circuit wrappers and/or software OS for connecting SDA integration network to functional mixed signal hardware and/or software IP imported into said IP containers as defined in the database schema.

5. The method of claim 1, further comprising the steps of:
   organizing and storing said mixed signal circuitry and software IP module design files into IP containers; and
   accessing said IP containers using a predetermined version control software system.

6. The method of claim 1, further comprising the step of providing a community based collaborative site based on our SDA methods.

7. The method of claim 1, further comprising the step of providing acollective system verification scripts driven design optimizations.

8. The method of claim 7, further comprising the step of forming said mixed signal circuitry and software wrappers into a relational database form.

9. The method of claim 8, further comprising the step of forming said mixed signal circuitry and software wrappers as absolute or relative IP tools.

10. The method of claim 9, further comprising the step of representing said IP tools in a cloud-based database for facilitating automation of said mixed circuitry and software IP tools.

11. A system for system design automation (SDA) of mixed signal electronic circuitry and software, comprising:
    a networked plurality of mixed signal circuitry and software sockets for instantiating from system integration database entries for mixed signal circuitry and software functional IP module blocks, further comprising the steps of:
    event wire and communication data outputs of hardware and software functional IP presented with identifiers according to output schema;

configurable input select control circuitry and/or software implemented for providing inputs of hardware and software functional IP using event wire and communication data output identifiers according to input schema;

configurable mode control registers, memory contents, and/or parameters implemented for providing functional IP module block functional modifiers according to mode schema;

said mixed signal circuitry and software wrappers assembled into an SDA generated design using a combination of network on a chip and/or software operating system and/or network beyond a chip to allow functional IP modules to operate together as a system.

12. The system of claim 11, further comprising said design automatically generated from a plurality of predetermined programs or scripts.

13. The system of claim 12, further comprising a plurality of inherited scripts providing stimuli and self-checks automatically executed from a set of predetermined IP module containers for verifying through simulation and/or validating through emulation implemented IP modules within their integrated form for automatically generated designs.

14. The system of claim 11, further comprising hardware circuit wrappers and/or software OS for connecting SDA integration network to functional mixed signal hardware and/or software IP imported into said IP containers as defined in the database schema.

15. The system of claim 11, further comprising:
IP containers fororganizing and storing said mixed signal circuitry and software IP module design files into; and
a predetermined version control software system for accessing said IP containers.

16. The system of claim 11, further comprising a community based collaborative site based on our SDA methods.

17. The system of claim 11, further comprising a predetermined set of collective system verification scripts driven design optimizations.

18. The system of claim 11, further comprising said mixed signal circuitry and software wrappers formed into a relational database form.

19. The system of claim 11, further comprising said mixed signal circuitry and software wrappers formed as absolute or relative IP tools.

20. The system of claim 11, further comprising said IP tools operating in a cloud-based database for facilitating automation of said mixed circuitry and software IP tools.

* * * * *